United States Patent
Miyato et al.

(10) Patent No.: US 12,214,607 B2
(45) Date of Patent: *Feb. 4, 2025

(54) IMAGE RECORDING METHOD

(71) Applicant: FUJIFILM Corporation, Tokyo (JP)

(72) Inventors: Takeshi Miyato, Kanagawa (JP); Michio Arai, Kanagawa (JP); Yusuke Fujii, Kanagawa (JP); Kenji Shirokane, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 455 days.

This patent is subject to a terminal disclaimer.

(21) Appl. No.: 17/582,222

(22) Filed: Jan. 24, 2022

(65) Prior Publication Data

US 2022/0143998 A1 May 12, 2022

Related U.S. Application Data

(63) Continuation of application No. PCT/JP2020/027293, filed on Jul. 13, 2020.

(30) Foreign Application Priority Data

Jul. 25, 2019 (JP) .................... 2019-137000

(51) Int. Cl.
*B41M 5/00* (2006.01)
*B41M 7/00* (2006.01)
(Continued)

(52) U.S. Cl.
CPC ........ *B41M 5/0064* (2013.01); *B41M 5/0017* (2013.01); *B41M 5/0023* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 11,807,024 B2 * 11/2023 Miyato .................. B41M 7/009
2014/0098158 A1 4/2014 Mukai et al.
(Continued)

FOREIGN PATENT DOCUMENTS

JP  2017-088646 A  5/2017
JP  2018-187829 A  11/2018
(Continued)

OTHER PUBLICATIONS

Extended European Search Report dated Oct. 20, 2022 from the European Patent Office in EP Application No. 20843388.8.
(Continued)

*Primary Examiner* — Manish S Shah
(74) *Attorney, Agent, or Firm* — Sughrue Mion, PLLC

(57) ABSTRACT

Provided is an image recording method including applying a pretreatment liquid containing water and a resin X and an ink containing water and a colorant onto a resin base material A which has a specific distortion rate and to which a tension is applied, to obtain an image, heating the image to a temperature $T_d$ and drying the image, and cooling the image to a temperature $T_r$, in which $\sigma_{total}$ calculated by Equation (1) is 40 kgf/cm² or less. $E(T_d)$ represents an elastic modulus of the resin X at the temperature $T_d$, $\varepsilon(T_d)$ represents an expansion coefficient of the resin base material A under specific conditions, $E(T)$ represents an elastic modulus of the resin X at a temperature T of the image in the cooling, $\alpha_r(T)$ represents a linear expansion coefficient of the resin X at the temperature T, and $\alpha_s(T)$ represents a linear expansion coefficient of the resin base material A under specific conditions.

$$\sigma_{total} = |\sigma_{dry} + \sigma_{cool}| \quad \text{Equation (1)}$$

$$\sigma_{dry} = E(T_d)\,\varepsilon(T_d) \quad \text{Equation (2)}$$

$$\sigma_{cool} = \int_{T_r}^{T_d} E(T)(\alpha_r(T) - \alpha_s(T))\,dT \quad \text{Equation (3)}$$

7 Claims, 1 Drawing Sheet

(51) Int. Cl.
  *C09D 11/104* (2014.01)
  *C09D 11/107* (2014.01)
  *C09D 11/30* (2014.01)
(52) U.S. Cl.
  CPC .......... *B41M 5/0047* (2013.01); *B41M 7/009* (2013.01); *C09D 11/104* (2013.01); *C09D 11/107* (2013.01); *C09D 11/30* (2013.01)
(58) Field of Classification Search
  CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
  See application file for complete search history.

(56) References Cited

U.S. PATENT DOCUMENTS

| | | | |
|---|---|---|---|
| 2015/0109365 A1* | 4/2015 | Taya | C09D 11/033 347/20 |
| 2018/0257104 A1* | 9/2018 | Che | B41M 5/0017 |
| 2019/0030918 A1 | 1/2019 | Matsumoto et al. | |
| 2019/0337319 A1* | 11/2019 | Araki | B41M 7/0027 |
| 2020/0131394 A1* | 4/2020 | Fujii | C09D 11/033 |
| 2020/0216703 A1* | 7/2020 | Fujii | C09D 11/54 |
| 2020/0317944 A1* | 10/2020 | Fukagawa | C09D 11/322 |
| 2020/0369904 A1* | 11/2020 | Fujii | B41M 5/0017 |

FOREIGN PATENT DOCUMENTS

| | | |
|---|---|---|
| JP | 2019-094377 A | 6/2019 |
| WO | 2017/069074 A1 | 4/2017 |
| WO | 2017/138436 A1 | 8/2017 |
| WO | 2018/142819 A1 | 8/2018 |
| WO | 2019/004485 A1 | 1/2019 |
| WO | 2019/064978 A1 | 4/2019 |

OTHER PUBLICATIONS

International Search Report dated Sep. 8, 2020 in Application No. PCT/JP2020/027293.
Written Opinion of the International Searching Authority dated Sep. 8, 2020 in Application No. PCT/JP2020/027293.
International Preliminary Report on Patentability dated Jan. 25, 2022 with a Translation of the Written Opinion of the International Searching Authority in Application No. PCT/JP2020/027293.

\* cited by examiner

IMAGE RECORDING METHOD

CROSS-REFERENCE TO RELATED APPLICATIONS

This application is a continuation application of International Application No. PCT/JP2020/027293, filed Jul. 13, 2020, the disclosure of which is incorporated herein by reference in its entirety. Further, this application claims priority from Japanese Patent Application No. 2019-137000, filed Jul. 25, 2019, the disclosure of which is incorporated herein by reference in its entirety.

BACKGROUND OF THE INVENTION

1. Field of the Invention

The present disclosure relates to an image recording method.

2. Description of the Related Art

In the related art, a technique of recording an image by applying a pretreatment liquid containing a resin (also referred to as a primer ink or the like) to a resin base material such as a plastic film and applying an ink onto the surface of the resin base material to which the pretreatment liquid has been applied is known.

For example, JP2017-88646A discloses, as a primer ink for ink jet recording which has excellent preservation stability and is capable of improving the adhesiveness, the bleeding property, and the water resistance of an image in a case of being printed on a recorded medium consisting of a plastic film, with an ink composition for ink jet recording, a primer ink for ink jet recording which is provided for a recorded medium consisting of a plastic film, the ink containing a water-soluble polyvalent metal salt as a component (A), a chlorinated polyolefin emulsion as a component (B), at least one of an acrylic emulsion or a vinyl acetate emulsion as a component (C), and water as a component (D). JP2017-88646A also discloses that a primer layer is formed on a plastic film using the above-described primer ink for ink jet recording, and an image is formed by applying an ink for ink jet recording onto the formed primer layer.

SUMMARY OF THE INVENTION

However, as a result of examination conducted by the present inventors, it was found that in a case where an image is obtained by sequentially applying a pretreatment liquid containing a resin and an ink to a specific resin base material in a state where a tension is applied thereto, and the image is recorded by performing a process of heating, drying, and cooling the obtained image in a state where a tension is applied to the specific resin base material, the adhesiveness between the recorded image and the specific resin base material is likely to decrease.

An object of one aspect of the present disclosure is to provide a method of recording an image on a specific resin base material in a state where a tension is applied thereto, which is an image recording method that enables suppression of a decrease in adhesiveness between the image to be recorded and the specific resin base material.

Specific means for achieving the above-described objects include the following aspects.

<1> An image recording method comprising: a step of preparing a resin base material A in which an absolute value of a distortion rate represented by Equation (a1) in a case where the base material is heated from 25° C. to 60° C. at a temperature increasing rate of 5° C./min and maintained at 60° C. for 2 minutes in a state where a tension of 30 N/m is applied thereto, and the base material is cooled to 25° C. at a temperature decreasing rate of 5° C./min in a state where a tension of 30 N/m is applied thereto is 0.05% or greater, a step of preparing a pretreatment liquid containing water and a resin X, a step of preparing an ink containing water and a colorant, an applying step of sequentially applying the pretreatment liquid and the ink onto the resin base material A to which a tension 51 of 10 N/m or greater is applied to obtain an image, a drying step of heating and drying the image to a temperature $T_d$ of 50° C. or higher in a state where a tension S2 of 10 N/m or greater is applied to the resin base material A, and a cooling step of cooling the image after the drying step to a temperature $T_r$ of 30° C. or lower in a state where a tension S3 of 10 N/m or greater is applied to the resin base material A, in which $\sigma_{total}$ to be calculated by Equation (1) is 40 kgf/cm² or less.

Distortion rate (%)=((length of resin base material in tension application direction at end of cooling−length thereof in tension application direction at start of heating)/length thereof in tension application direction at start of heating)×100   Equation (a1)

$$\sigma_{total} = |\sigma_{dry} + \sigma_{cool}| \quad \text{Equation (1)}$$

$$\sigma_{dry} = E(T_d)\varepsilon(T_d) \quad \text{Equation (2)}$$

$$\sigma_{cool} = \int_{T_r}^{T_d} E(T)(\alpha_r(T) - \alpha_s(T))dT \quad \text{Equation (3)}$$

In Equation (1), $\sigma_{dry}$ is calculated by Equation (2), and $\sigma_{cool}$ is calculated by Equation (3).

In Equation (2), $E(T_d)$ represents an elastic modulus of the resin X at the temperature $T_d$ which is expressed in a unit of kgf/cm², $\varepsilon(T_d)$ represents an expansion coefficient of the length of the resin base material A represented by Equation (a2) in the tension application direction in a case where the base material is heated from 25° C. to the temperature $T_d$ and maintained at the temperature $T_d$ in a state where the tension S2 is applied thereto, and the base material is cooled to 25° C. in a state where the tension S2 is applied thereto.

Expansion coefficient of length of resin base material A in tension application direction=(length of resin base material in tension application direction at end of cooling−length thereof in tension application direction at start of heating)/length thereof in tension application direction at start of heating   Equation (a2)

In Equation (3), E(T) represents an elastic modulus of the resin X at a temperature T of the image in the cooling step which is expressed in the unit of kgf/cm², $\alpha_r(T)$ represents a linear expansion coefficient of the resin X at the temperature T, $\alpha_s(T)$ represents a linear expansion coefficient of the resin base material A in the tension application direction in a state where the tension S3 is applied thereto at the temperature T, $T_d$ represents the temperature $T_d$, and $T_r$ represents the temperature $T_r$.

<2> The image recording method according to <1>, in which $\sigma_{total}$ is 30 kgf/cm² or less.

<3> The image recording method according to <1> or <2>, in which the tension S1, the tension S2, and the tension S3 are each independently in a range of 10 N/m to 60 N/m.

<4> The image recording method according to any one of <1> to <3>, in which the resin base material A has a thickness of 12 μm to 60 μm.

<5> The image recording method according to any one of <1> to <4>, in which the resin base material A is a polypropylene base material or a nylon base material.

<6> The image recording method according to any one of <1> to <5>, in which the resin X is at least one of an acrylic resin or a polyester resin.

<7> The image recording method according to any one of <1> to <6>, in which the resin base material A has a long film shape, and the application of the pretreatment liquid and the ink in the applying step, the drying of the image in the drying step, and the cooling of the image in the cooling step are performed while the resin base material A is transported in a longitudinal direction of the resin base material A using a roll-to-roll method.

According to one aspect of the present disclosure, it is possible to provide a method of recording an image on a specific resin base material in a state where a tension is applied thereto, which is an image recording method that enables suppression of a decrease in adhesiveness between the image to be recorded and the specific resin base material.

DESCRIPTION OF THE PREFERRED EMBODIMENTS

Figure 1:
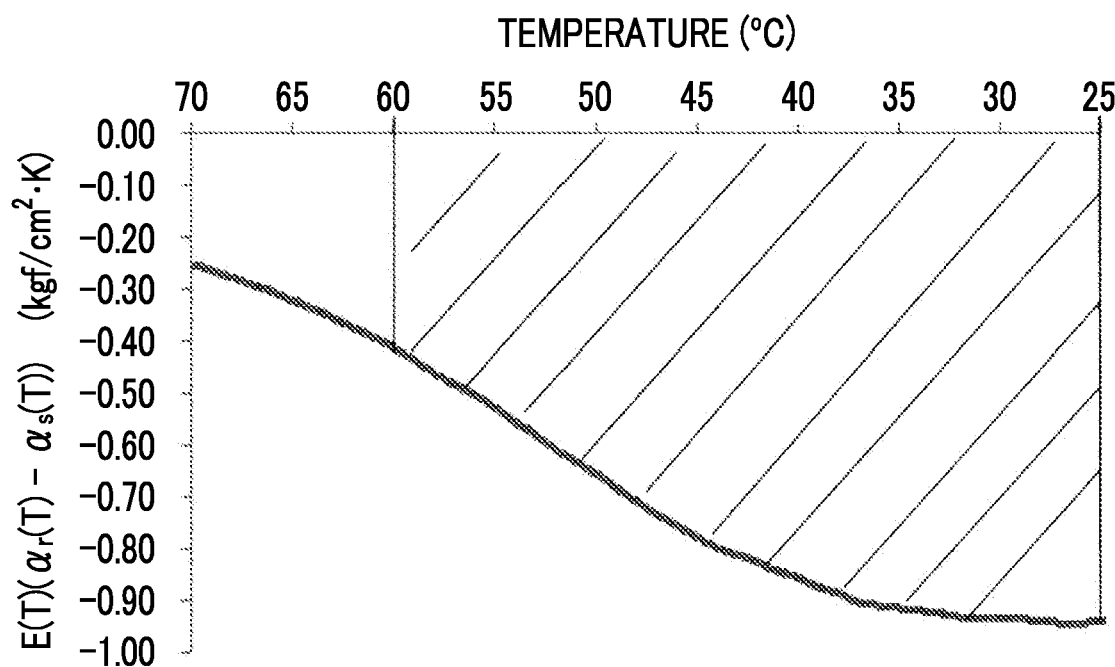
FIG. 1 is a graph showing the relationship between a temperature T of an image during a cooling step and "E(T)($\alpha_r$(T)−$\alpha_s$(T))" in an example of the image recording method of the present disclosure.

In the present disclosure, a numerical range shown using "to" indicates a range including the numerical values described before and after "to" as a lower limit and an upper limit.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or a value described in an example.

In the present disclosure, the meaning of the term "step" includes not only an independent step but also a step whose intended purpose is achieved even in a case where the step is not clearly distinguished from other steps.

In the present disclosure, a combination of preferred embodiments is a more preferred embodiment.

In the present disclosure, kgf/cm$^2$ is a unit in terms of Conversion Formula "1 kgf/cm$^2$=9.80665×10$^{-2}$ MPa".

[Image Recording Method]

An image recording method of the present disclosure includes a step of preparing a resin base material A in which an absolute value of a distortion rate represented by Equation (a1) in a case where the base material is heated from 25° C. to 60° C. at a temperature increasing rate of 5° C./min and maintained at 60° C. for 2 minutes in a state where a tension of 30 N/m is applied thereto, and the base material is cooled to 25° C. at a temperature decreasing rate of 5° C./min in a state where a tension of 30 N/m is applied thereto is 0.05% or greater, a step of preparing a pretreatment liquid containing water and a resin X, a step of preparing an ink containing water and a colorant, an applying step of sequentially applying the pretreatment liquid and the ink onto the resin base material A to which a tension S1 of 10 N/m or greater is applied to obtain an image, a drying step of heating and drying the image to a temperature $T_d$ of 50° C. or higher in a state where a tension S2 of 10 N/m or greater is applied to the resin base material A, and a cooling step of cooling the image after the drying step to a temperature $T_r$ of 30° C. or lower in a state where a tension S3 of 10 N/m or greater is applied to the resin base material A, in which $\sigma_{total}$ to be calculated by Equation (1) is 40 kgf/cm$^2$ or less.

Distortion rate (%)=((length of resin base material in tension application direction at end of cooling−length thereof in tension application direction at start of heating)/length thereof in tension application direction at start of heating)×100    Equation (a1)

$$\sigma_{total} = |\sigma_{dry} + \sigma_{cool}| \qquad \text{Equation (1)}$$

$$\sigma_{dry} = E(T_d)\,\varepsilon(T_d) \qquad \text{Equation (2)}$$

$$\sigma_{cool} = \int_{T_r}^{T_d} E(T)(\alpha_r(T) - \alpha_s(T))dT \qquad \text{Equation (3)}$$

In Equation (1), $\sigma_{dry}$ is calculated by Equation (2), and $\Gamma_{cool}$ is calculated by Equation (3).

In Equation (2), E($T_d$) represents an elastic modulus of the resin X at the temperature $T_d$ which is expressed in a unit of kgf/cm$^2$, $\varepsilon(T_d)$ represents an expansion coefficient of the length of the resin base material A represented by Equation (a2) in the tension application direction in a case where the base material is heated from 25° C. to the temperature $T_d$ and maintained at the temperature $T_d$ in a state where the tension S2 is applied thereto, and the base material is cooled to 25° C. in a state where the tension S2 is applied thereto.

Expansion coefficient of length of resin base material A in tension application direction=(length of resin base material in tension application direction at end of cooling−length thereof in tension application direction at start of heating)/length thereof in tension application direction at start of heating    Equation (a2)

In Equation (3), E(T) represents an elastic modulus of the resin X at a temperature T of the image in the cooling step which is expressed in the unit of kgf/cm$^2$, $\alpha_r$(T) represents a linear expansion coefficient of the resin X at the temperature T, $\alpha_s$(T) represents a linear expansion coefficient of the resin base material A in the tension application direction in a state where the tension S3 is applied thereto at the temperature T, $T_d$ represents the temperature $T_d$, and $T_r$ represents the temperature $T_r$.

The image recording method of the present disclosure is a method of recording an image on the resin base material A in a state where a tension is applied thereto, which is an image recording method that enables suppression of a decrease in adhesiveness between the image to be recorded and the resin base material A.

Here, the image has a laminated structure in which a layer derived from the pretreatment liquid (that is, a layer in contact with the resin base material A) and a layer derived from the ink are laminated.

Hereinafter, the above-described effects will be described in more detail.

The resin base material A is a resin base material having a large residual distortion in a case where the base material is heated and cooled in a state where a tension is applied (specifically, the absolute value of the distortion rate (%) is 0.05% or greater).

As a result of examination conducted by the present inventors, it was found that in a case where an image is obtained by sequentially applying a pretreatment liquid containing a resin and an ink to such a resin base material A in a state where a tension is applied thereto, and the image is recorded by performing a process of heating, drying, and cooling the obtained image in a state where a tension is applied to the resin base material A, the adhesiveness between the recorded image and the resin base material A is likely to decrease. Here, the "heating and drying" indicates that the image is heated and dried.

According to the image recording method of the present disclosure, a decrease in the adhesiveness between the image and the resin base material A (hereinafter, also simply referred to as "the adhesiveness of the image") in a case where the image is recorded on the resin base material A by performing the above-described process can be suppressed.

The reason why the effect of the adhesiveness of the image is exhibited is assumed as follows.

The decrease in the adhesiveness of the image is considered to occur due to a large residual stress between the resin base material A and the image after being heated, dried, and cooled because the absolute value of the distortion rate of the resin base material A is 0.05% or greater. The residual stress is considered to be due to the residual distortion of the resin base material A.

The stress between the image and the resin base material A is considered to be mainly generated during the maintaining of the image at the temperature $T_d$ which is the maximum reached temperature in a case of heating and drying the image and in the process of cooling the image. It is considered that the residual stress is determined by adding up these stresses.

In addition, it is considered that the stress is not generated in the process before the temperature of the image reaches the maximum reached temperature. The reason for this is considered to be that liquid components such as water remain in the image (including the layer derived from the pretreatment liquid), and thus the image is soft.

Further, it is considered that the stress due to a difference in the linear expansion coefficient between the image and the resin base material A is not generated in the case of heating and drying the image. The reason for this is that the temperature of the image is maintained at the temperature $T_d$ (that is, at a constant temperature).

In consideration of the above-described points, in the image recording method of the present disclosure, $\sigma_{dry}$ is acquired as a value that correlates with the stress generated during the maintaining of the image at the temperature $T_d$ (that is, the maximum reached temperature), $\sigma_{cool}$ is acquired as a value that correlates with the stress generated in the process of cooling the image, $\sigma_{total}$ is acquired as a value that correlates with the residual stress based on $\sigma_{dry}$ and $\sigma_{cool}$, and ta $\sigma_{total}$ is limited to 40 kgf/cm² or less. In this manner, a decrease in adhesiveness between the image and the resin base material A is considered to be suppressed because the residual stress between the resin base material A and the image is reduced.

Here, $\sigma_{dry}$ and $\sigma_{cool}$ each may be a positive value or a negative value.

For example, in a case where the resin base material A expands during the maintaining of the image at the temperature $T_d$ in the case of heating and drying the image, $\varepsilon(T_d)$ in Equation (2) is a positive value and $\sigma_{dry}$ is also a positive value.

Further, in a case where the resin base material A contracts during the maintaining of the image at the temperature $T_d$ in the case of heating and drying the image, $\varepsilon(T_d)$ in Equation (2) is a negative value and $\sigma_{dry}$ is also a negative value.

Further, in a case where both the resin base material A and the image contract in the entire range of the temperature $T_r$ to the temperature $T_d$ during the cooling of the image, both the linear expansion coefficient of $(\alpha_s(T))$ of the resin base material A and the linear expansion coefficient $(\alpha_r(T))$ of the resin X in the image (specifically, the layer derived from the pretreatment liquid) are positive values. Here, in a case where $\alpha_s(T)$ is smaller than $\alpha_r(T)$ in the entire range of the temperature $T_r$ to the temperature $T_d$ (schematically, in a case where the contraction amount of the resin base material A with respect to the temperature decrease is smaller than the contraction amount of the image with respect to the temperature decrease), "$\alpha_r(T)-\alpha_s(T)$" in Equation (3) is a positive value, and thus $\sigma_{cool}$ is also a positive value.

Further, in a case where the resin base material A expands and the image contracts in the entire range of the temperature $T_r$ to the temperature $T_d$ during the cooling of the image, $\alpha_s(T)$ is a negative value and $\alpha_r(T)$ is a positive value, and thus "$\alpha_r(T)-\alpha_s(T)$" in Equation (3) is a positive value. As a result, $\sigma_{cool}$ is also a positive value.

Further, in a case where both the resin base material A and the image contract in the entire range of the temperature $T_r$ to the temperature $T_d$, and $\alpha_s(T)$ is larger than $\alpha_r(T)$ in the entire range of the temperature $T_r$ to the temperature $T_d$ (schematically, in a case where the contraction amount of the resin base material A with respect to the temperature decrease is greater than the contraction amount of the image with respect to the temperature decrease) during the cooling of the image, "$\alpha_r(T)-\alpha_s(T)$" in Equation (3) is a negative value, and thus $\sigma_{cool}$ is also a negative value.

$\sigma_{total}$ represents the absolute value of the sum of $\sigma_{dry}$ and $\sigma_{cool}$ (Equation (1)) and is a value that correlates with the residual stress.

As an example, even in a case where the stress is generated due to the expansion of the resin base material A during the maintaining of the image at the temperature $T_d$ in the case of heating and drying the image (that is, in a case where $\sigma_{dry}$ is a positive value), $\sigma_{cool}$ is a negative value in a case where the contraction amount of the resin base material A with respect to the temperature decrease is larger than the contraction amount of the resin X with respect to the temperature decrease during the cooling of the image. In this case, $\sigma_{dry}$ and $\sigma_{cool}$ cancel each other out, and $\sigma_{total}$ decreases. This indicates that a stress in a direction opposite to the direction of the stress generated during the heating and drying of the image is generated due to the cooling of the image, and as a result, the stress is relaxed and the residual stress decreases.

As another example, in a case where the stress is generated due to the expansion of the resin base material A during the maintaining of the image at the temperature $T_d$ in the case of heating and drying the image (that is, in a case where $\sigma_{dry}$ is a positive value), $\sigma_{cool}$ is a positive value in a case where the contraction amount of the resin base material A with respect to the temperature decrease is smaller than the contraction amount of the resin X with respect to the temperature decrease during the cooling of the image. In this case, $\sigma_{dry}$ as a positive value and $\sigma_{cool}$ as a positive value are added up, and thus $\sigma_{total}$ increases. This indicates that a stress in the same direction as the direction of the stress generated during the heating and drying of the image is generated due to the cooling of the image, and as a result, the stress increases and the residual stress increases.

$\sigma_{dry}$, $\sigma_{cool}$, and $\sigma_{total}$ may not necessarily match the actual stress, but even in this case, $\sigma_{total}$ is still a value that correlates with the residual stress.

Therefore, the actual residual stress can be decreased by decreasing $\sigma_{total}$ the to 40 kgf/cm$^2$ or less, and as a result, the decrease in the adhesiveness between the resin base material A and the image due to the residual stress can be suppressed.

Hereinafter, first, the resin base material A, $\sigma_{dry}$, $\sigma_{cool}$, $\sigma_{total}$, the tension S1, the tension S2, and the tension S3 in the image recording method of the present disclosure will be described.

<Resin Base Material A>

In the image recording method of the present disclosure, an image is recorded on the resin base material A.

The resin base material A is a resin base material A in which an absolute value of a distortion rate represented by Equation (a1) (hereinafter, also referred to as a "distortion rate (a1)") in a case where the base material is heated from 25° C. to 60° C. at a temperature increasing rate of 5° C./min and maintained at 60° C. for 2 minutes in a state where a tension of 30 N/m is applied thereto, and the base material is cooled to 25° C. at a temperature decreasing rate of 5° C./min in a state where a tension of 30 N/m is applied thereto is 0.05% or greater.

Distortion rate (%)=((length of resin base material in tension application direction at end of cooling−length thereof in tension application direction at start of heating)/length thereof in tension application direction at start of heating)×100      Equation (a1)

In Equation (a1), the "length of resin base material in tension application direction at end of cooling−length thereof in tension application direction at start of heating" indicates a change in length of the resin base material A during the maintaining of the resin base material A at a temperature of 60° C. in the state where a tension of 30 N/m is applied thereto.

In addition, the relationship between the change in the length of the resin base material A in the process of increasing the temperature of the resin base material A and the change in the length of the resin base material A in the process of decreasing the temperature of the resin base material A is a relationship that both cancel each other out. That is, the total of the expansion amount of the resin base material A in the process of increasing the temperature of the resin base material A (that is, the expansion amount set to be a positive value in a case where the resin base material A expands and set to be a negative value in a case where the resin base material A contracts, the same applies hereinafter) and the expansion amount of the resin base material A in the process of decreasing the temperature of the resin base material is 0. Therefore, the change in length of the resin base material A during the maintaining of the resin base material at a temperature of 60° C. in a state where a tension of 30 N/m is applied thereto is acquired by the expression of "length of resin base material in tension application direction at end of cooling−length thereof in tension application direction at start of heating".

The distortion rate (a1) of the resin base material A corresponds to the residual distortion in a case where the resin base material A in a state where a tension is applied is heated and cooled.

The residual distortion corresponds to distortion during the maintaining of the resin base material at a temperature of 60° C. The reason for this is considered to be that the change in length of the resin base material A in the process of increasing the temperature of the resin base material A and the change in length of the resin base material A in the process of decreasing the temperature of the resin base material A cancel each other out as described above.

In a case where the resin base material A is used for image recording, since the absolute value of the distortion rate (a1) is 0.05% or greater, a residual stress caused by the residual distortion is likely to be generated. Therefore, the resin base material A is a base material in which the adhesiveness of the image is likely to decrease.

The distortion rate (a1) is a distortion rate measured under the above-described specific conditions (the tension, the temperature increasing rate, the maximum reached temperature, the holding time, the temperature decreasing rate, the minimum reached temperature, and the like).

However, the conditions in the image recording method of the present disclosure are not limited to the specific conditions described above.

That is, the resin base material A in which the absolute value of the distortion rate (a1) is 0.05% or greater is a resin base material in which the adhesiveness of the image is likely to decrease because the residual distortion in a case where the resin base material is heated, dried, and cooled under conditions other than the specific conditions is large as compared with a resin base material in which the absolute value of the distortion rate (a1) is less than 0.05%.

The image recording method of the present disclosure is a method for improving the adhesiveness of an image to such a resin base material A.

(Method of Measuring Distortion Rate (a1))

The distortion rate (a1) is measured by a tension type measuring method using a thermomechanical analyzer. In the examples described below, "TMA4000SE" (manufactured by NETZSCH) is used as the thermomechanical analyzer.

The details of the tension type measuring method are as follows.

A tension of 30 N/m is applied to the resin base material by adjusting the temperature of the resin base material to 25° C., grasping both ends of the resin base material whose temperature has been adjusted with a chuck, and applying a force in the tension direction. The tension is appropriately adjusted such that a tension of 30 N/m is maintained until the measurement of the distortion rate (a1) is completed.

Next, the resin base material is heated from 25° C. to 60° C. at a temperature increasing rate of 5° C./min.

Next, the resin base material is maintained at a temperature of 60° C. for 2 minutes.

Next, the resin base material is cooled to 25° C. at a temperature decreasing rate of 5° C./min.

The distortion rate (a1) is calculated by Equation (a1) based on the length of the resin base material in the tension application direction at the start of the heating and the length thereof in the tension application direction at the end of the cooling.

The absolute value of the distortion rate (a1) of the resin base material A may be 0.05% or greater, and may also be 0.10% or greater, 0.15% or greater, or 0.18% or greater.

In general, the adhesiveness of the image is likely to decrease as the absolute value of the distortion rate (a1) increases, and thus the improvement range of the adhesiveness in a case where the image recording method of the present disclosure is applied increases.

The upper limit of the absolute value of the distortion rate (a1) of the resin base material A is not particularly limited and may be, for example, 0.80%, 0.53%, 0.26%, or the like.

The shape of the resin base material A is not particularly limited, but it is preferable that the resin base material A has a film shape (that is, a sheet shape).

The thickness of the resin base material A is not particularly limited, but is preferably in a range of 12 μm to 200 μm, more preferably in a range of 12 μm to 100 μm, still more preferably in a range of 12 μm to 60 μm, and even still more preferably in a range of 15 μm to 60 μm.

From the viewpoint of easily applying the tension S1, the tension S2, and the tension S3, it is more preferable that the resin base material A has a long film shape (that is, a long sheet shape).

The length of the resin base material A in a case of having a long film shape is not particularly limited, but is preferably 5 m or greater, more preferably 10 m or greater, and still more preferably 100 m or greater.

The upper limit of the length of the resin base material A in a case of having a long film shape is not particularly limited and may be, for example, 10000 m, 8000 m, or 5000 m.

The resin base material A may be subjected to a surface treatment from the viewpoint of improving the surface energy.

Examples of the surface treatment include a corona treatment, a plasma treatment, a flame treatment, a heat treatment, an abrasion treatment, and a light irradiation treatment (UV treatment), but the surface treatment is not limited thereto.

The resin base material A is not particularly limited as long as the absolute value of the distortion rate (a1) is 0.05% or greater, and examples thereof include a polyethylene base material, a polypropylene base material, and a nylon base material.

The polyethylene base material may be a stretched polyethylene base material or an unstretched polyethylene base material, but a stretched polyethylene base material is preferable.

The polypropylene base material may be a stretched polypropylene base material or an unstretched polypropylene base material, but a stretched polypropylene base material is preferable.

The nylon base material may be a stretched nylon base material or an unstretched nylon base material, but a stretched nylon base material is preferable.

Examples of the resin base material A include a biaxially stretched polypropylene base material "FOR-AQ" (manufactured by Futamura Chemical Co., Ltd., thickness of 25 μm, distortion rate (a1) of 0.18%), a simultaneously biaxially stretched nylon base material "EMBLEM (registered trademark) ON-15" (manufactured by Unitika Ltd., thickness of 15 μm, distortion rate (a1) of −0.26%), and a monoaxially stretched polypropylene base material "PE3K-BT" (manufactured by Futamura Chemical Co., Ltd., thickness of 23 μm, distortion rate (a1) of 0.23%).

Compared to these examples of the resin base material A, for example, the distortion rate (a1) of a biaxially stretched polyester base material "FE2001" (manufactured by Futamura Chemical Co., Ltd., thickness of 25 μm) is 0.01%.

<$\sigma_{total}$>

In the image recording method of the present disclosure, $\sigma_{total}$ to be calculated by Equation (1) is 40 kgf/cm$^2$ or less. $\sigma_{total}$ may be 0 kgf/cm$^2$.

$$\sigma_{total} = |\sigma_{dry} + \sigma_{cool}| \quad \text{Equation (1)}$$

In Equation (1), $\sigma_{dry}$ is a value that is calculated by Equation (2) shown below and correlates with the stress between the resin base material A and the image during the heat and the drying. $\sigma_{dry}$ can be a positive value or a negative value.

In Equation (1), $\sigma_{cool}$ is a value that is calculated by Equation (3) shown below and correlates with the stress between the resin base material A and the image during the cooling. $\sigma_{cool}$ can be a positive value or a negative value.

As shown in Equation (1), $\sigma_{total}$ is an absolute value of the sum of $\sigma_{dry}$ and $\sigma_{cool}$, and is a final (that is, after the heating and the drying in the drying step and the cooling in the cooling step) value that correlates with the residual stress between the resin base material A and the image.

Further, $\sigma_{total}$ is calculated by rounding off the first digit after the decimal point in the absolute value of the sum of $\sigma_{dry}$ and $\sigma_{cool}$.

From the viewpoint of further improving the adhesiveness between the image and the resin base material A, $\sigma_{total}$ is preferably 30 kgf/cm$^2$ or less, more preferably 20 kgf/cm$^2$ or less, and particularly preferably 10 kgf/cm$^2$ or less.

<$\sigma_{dry}$>

$\sigma_{dry}$ is a value to be calculated by Equation (2).

$$\sigma_{dry} = E(T_d)\varepsilon(T_d) \quad \text{Equation (2)}$$

In Equation (2), $E(T_d)$ represents an elastic modulus of the resin X at the temperature $T_d$ which is expressed in a unit of kgf/cm$^2$, $\varepsilon(T_d)$ represents an expansion coefficient of the length of the resin base material A represented by Equation (a2) in the tension application direction in a case where the base material is heated from 25° C. to the temperature $T_d$ and maintained at the temperature $T_d$ in a state where the tension S2 is applied thereto, and the base material is cooled to 25° C. in a state where the tension S2 is applied thereto.

Expansion coefficient of length of resin base material A in tension application direction=(length of resin base material in tension application direction at end of cooling−length thereof in tension application direction at start of heating)/length thereof in tension application direction at start of heating  Equation (a2)

As $E(T_d)$ and $\varepsilon(T_d)$, measured values of two significant figures are respectively applied. The methods of measuring $E(T_d)$ and $\varepsilon(T_d)$ will be described below.

$\sigma_{dry}$ is acquired as a value of two significant figures.

$\sigma_{dry}$ to be calculated by Equation (2) correlates with the stress between the resin base material A and the image which is generated during the heating and the drying in the drying step (specifically, during the maintaining of the image at the temperature $T_d$).

Hereinafter, this point will be described in more detail.

An image recording method of the present disclosure includes an applying step of sequentially applying a pretreatment liquid containing water and a resin X and an ink containing water and a colorant onto the resin base material A to which a tension S1 of 10 N/m or greater is applied to obtain an image, and a drying step of heating and drying the image to a temperature $T_d$ of 50° C. or higher in a state where a tension S2 of 10 N/m or greater is applied to the resin base material A.

The image obtained in the applying step has a laminated structure in which a layer derived from the pretreatment liquid (that is, a layer in contact with the resin base material A) and a layer derived from the ink are laminated.

The obtained image is heated and dried in the drying step.

$E(T_d)$ in Equation (2) is an elastic modulus (unit: kgf/cm$^2$) of the resin X, which is one component of the pretreatment liquid, at the temperature $T_d$.

$E(T_d)$ is correlated with the elastic modulus of the layer derived from the pretreatment liquid in the image (that is, the layer in contact with the resin base material A) at the temperature $T_d$ (the same applies to E(T) described below).

Further, $\varepsilon(T_d)$ in Equation (2) is an expansion coefficient of the resin base material A represented by Equation (a2) (hereinafter, also referred to as an "expansion coefficient (a2)") in the tension application direction in a case where the resin base material is heated from 25° C. to the temperature $T_d$ and maintained at the temperature $T_d$ in a state where the tension S2 is applied thereto, and is cooled to 25° C. in a state where the tension S2 is applied thereto.

Expansion coefficient of length of resin base material A in tension application direction=(length of resin base material in tension application direction at end of cooling−length thereof in tension application direction at start of heating)/length thereof in tension application direction at start of heating    Equation (a2)

In Equation (a2), the "length of resin base material in tension application direction at end of cooling−length thereof in tension application direction at start of heating" indicates a change (that is, distortion) in length of the resin base material A during the maintaining of the image at the temperature of $T_d$ in a state where the tension S2 is applied to the resin base material A in the drying step. For the reason, the description of Equation (a1) shown above can be referred to.

In Equation (2), $\sigma_{dry}$ is acquired by the product of $E(T_d)$ and $\varepsilon(T_d)$ (that is, the expansion coefficient (a2) of the resin base material A) described above.

The obtained $\sigma_{dry}$ is a value that is correlated with the stress generated during the maintaining of the image at the temperature $T_d$ between the resin base material A and the layer derived from the pretreatment liquid in the image (that is, the layer in contact with the resin base material A).

In addition, Equation (2) is an equation for calculating $\sigma_{dry}$ related to the stress of the layer derived from the pretreatment liquid with respect to the resin base material A under the following preconditions. The same applies to Equation (3) described below.

- The physical properties of the layer derived from the pretreatment liquid are correlated with the physical properties of the resin X.
- The temperature of the resin base material A is equal to the temperature of the layer derived from the pretreatment liquid on the resin base material A.
- The length of the layer derived from the pretreatment liquid on the resin base material A changes according to the change in the length of the resin base material A.

Therefore, the product of $E(T_d)$ (that is, the elastic modulus of the resin X) and $\varepsilon(T_d)$ (that is, the expansion coefficient of the resin base material A) in Equation (2) substantially corresponds to the product of $E(T_d)$ (that is, the elastic modulus of the resin X) and the expansion coefficient of the resin X.

(Method of Measuring $E(T_d)$)

$E(T_d)$ in Equation (2) is measured as follows.

A release agent layer of a polyethylene terephthalate base material provided with a release agent layer is coated with an aqueous dispersion liquid of the resin X, dried, and peeled from the base material, thereby preparing a self-supporting film having a thickness of 50 μm which contains the resin X.

Dynamic viscoelasticity measurement is performed on the obtained self-supporting film using a dynamic viscoelasticity tester under the conditions of a test temperature of 25° C. to 130° C., a temperature increasing rate of 5° C./min, and a frequency of 10 Hz, and the elastic modulus of the film at the temperature $T_d$ is acquired based on the obtained results. The obtained elastic modulus thereof at the temperature $T_d$ is defined as $E(T_d)$.

In the examples described below, a DVA225 type dynamic viscoelasticity tester (manufactured by ITK Corp.) is used as the dynamic viscoelasticity tester.

(Method of Measuring $\varepsilon(T_d)$)

$\varepsilon(T_d)$ in Equation (2) (that is, the expansion coefficient (a2) of the resin base material A) is measured by a tension type measuring method using a thermomechanical analyzer. In the examples described below, "TMA4000SE" (manufactured by NETZSCH) is used as the thermomechanical analyzer.

The details of the tension type measuring method are as follows.

The tension S2 is applied to the resin base material by adjusting the temperature of the resin base material to 25° C., grasping both ends of the resin base material A whose temperature has been adjusted with a chuck, and applying a force in the tension direction. The tension is appropriately adjusted such that the tension S2 is maintained until the measurement of the expansion coefficient (a2) is completed.

Next, the resin base material A is heated from 25° C. to the temperature $T_d$ at a temperature increasing rate of 5° C./min.

Next, the resin base material is maintained at the temperature $T_d$ for 2 minutes.

Next, the resin base material is cooled to 25° C. at a temperature decreasing rate of 5° C./min.

The expansion coefficient (a2) is acquired by Equation (a2) based on the length of the resin base material in the tension application direction at the start of the heating and the length thereof in the tension application direction at the end of the cooling, and the obtained value is defined as $\varepsilon(T_d)$.

<$\sigma_{cool}$>

$\sigma_{cool}$ is a value to be calculated by Equation (3).

$$\sigma_{cool} = \int_{T_r}^{T_d} E(T)(\alpha_r(T) - \alpha_s(T))dT \qquad \text{Equation (3)}$$

In Equation (3), E(T) represents an elastic modulus of the resin X at a temperature T of the image in the cooling step which is expressed in the unit of kgf/cm$^2$, $\alpha_r(T)$ represents a linear expansion coefficient of the resin X at the temperature T, $\alpha_s(T)$ represents a linear expansion coefficient of the resin base material A in the tension application direction in a state where the tension S3 is applied thereto at the temperature T, $T_d$ represents the temperature $T_d$, and $T_r$ represents the temperature $T_r$.

Here, the unit of the linear expansion coefficient is 1/K.

A measured value of three significant figures is applied as E(T), and measured values of two significant figures are respectively applied as $\alpha_r(T)$ and $\alpha_s(T)$.

The methods of measuring E(T), $\alpha_r(T)$, and $\alpha_s(T)$ will be described below.

"$\alpha_r(T)-\alpha_s(T)$", "$E(T)(\alpha_r(T)-\alpha_s(T))$", and $\sigma_{cool}$ are respectively acquired as values of two significant figures.

$\sigma_{cool}$ to be calculated by Equation (3) is correlated with the stress between the resin base material A and the image, which is generated in the process of decreasing the temperature of the image from the temperature $T_d$ to the temperature $T_r$ in the cooling step.

Hereinafter, this point will be described in more detail.

The cooling step is a step of cooling the image after the drying step to a temperature $T_r$ of 30° C. or lower in a state where a tension S3 of 10 N/m or greater is applied to the resin base material A.

Since the temperature of the image and the resin base material A decreases in the cooling step, a stress is generated due to a difference between the linear expansion coefficient of the image (specifically, the layer derived from the pretreatment liquid) and the linear expansion coefficient of the resin base material A.

In Equation (3), this difference is approximately defined as "$\alpha_r(T)-\alpha_s(T)$".

$\alpha_s(T)$ corresponds to the linear expansion coefficient of the resin base material A in the cooling step. Specifically, $\alpha_s(T)$ is the linear expansion coefficient of the resin base material A in the tension application direction of in a state where the tension S3 is applied thereto at the temperature T.

$\alpha_r(T)$ corresponds to the linear expansion coefficient of the layer derived from the pretreatment liquid at the temperature T. Specifically, $\alpha_r(T)$ is the linear expansion coefficient of the resin X in the tension application direction at the temperature T. Here, the tension is not considered for $\alpha_r(T)$. The reason for this is that the thickness of the image is sufficiently small as compared with the thickness of the resin base material A.

The ratio of the thickness of the image to the thickness of the resin base material A (that is, the thickness ratio [image/resin base material]) is preferably 0.5 or less, more preferably 0.3 or less, and still more preferably 0.2 or less.

The lower limit of the thickness ratio [image/resin base material] is not particularly limited. The lower limit of the thickness ratio [image/resin base material] may be, for example, 0.005, 0.01, or 0.05.

Equation (3) includes "$E(T)(\alpha_r(T)-\alpha_s(T))$" which is the product of "$\alpha_r(T)-\alpha_s(T)$" and the elastic modulus (E(T)) of the resin X at the temperature T (that is, the temperature of the image in the cooling step). The "$E(T)(\alpha_r(T)-\alpha_s(T))$" is correlated with the stress at the time point at which the temperature of the image and the resin base material A reaches the temperature T. In Equation (3), the integrated value of the "$E(T)(\alpha_r(T)-\alpha_s(T))$" from the temperature $T_d$ to the temperature $T_r$ is defined as $\sigma_{cool}$.

The obtained $\sigma_{cool}$ is correlated with the stress between the resin base material A and the image, which is generated in the process of decreasing the temperature of the image from the temperature $T_d$ to the temperature $T_r$ in the cooling step.

$\sigma_{cool}$ to be calculated by Equation (3) is acquired as follows.

E(T), $\alpha_r(T)$, and $\alpha_s(T)$ are measured for each temperature T obtained by dividing a range of the temperature $T_r$ or higher and the temperature $T_d$ or lower at intervals of 0.1° C.

"$E(T)(\alpha_r(T)-\alpha_s(T))$" at each of the above-described temperatures T is acquired based on the obtained results.

A graph showing the relationship between the temperature T and "$E(T)(\alpha_r(T)-\alpha_s(T))$" is prepared, an area enclosed by the curve of the obtained graph, the straight line showing the temperature $T_r$, the straight line showing the temperature $T_d$, and the straight line in which "$E(T)(\alpha_r(T)-\alpha_s(T))$" is 0 is acquired, and the integrated value of "$E(T)(\alpha_r(T)-\alpha_s(T))$" from the temperature $T_d$ to the temperature $T_r$, that is, $\sigma_{cool}$ is acquired based on the obtained area. As described above, $\sigma_{cool}$ can be a positive value or a negative value.

FIG. 1 is a graph showing the relationship between the temperature T of the image during the cooling step and "$E(T)(\alpha_r(T)-\alpha_s(T))$" in an example of the image recording method of the present disclosure.

In the example, $\sigma_{cool}$ is acquired based on the area of the shaded portion in FIG. 1.

(Method of Measuring E(T))

E(T) at each temperature T is measured in the same manner as $E(T_d)$ except that the measurement temperature is changed to each temperature T.

(Method of Measuring $\alpha_r(T)$)

$\alpha_r(T)$ at each temperature T is measured as follows.

A self-supporting film containing the resin X is prepared in the same manner as that for the self-supporting film prepared in the measurement of $E(T_d)$.

A 5 mm×5 mm square sample is cut out from the obtained self-supporting film, and the linear expansion coefficient of the cut-out sample at each temperature T is measured by a compression type measuring method using a thermomechanical analyzer. In the examples described below, "TMA4000SE" (manufactured by NETZSCH) is used as the thermomechanical analyzer.

The details of the compression type measuring method are as follows.

The temperature of the sample is adjusted to 25° C., and a weight of 1 kPa is applied to the sample whose temperature has been adjusted to 25° C. in the thickness direction of the sample. In this state, the linear expansion coefficient of the sample at each temperature T is measured while the temperature of the sample is changed. The obtained linear expansion coefficient is defined as $\alpha_r(T)$ at each temperature T (that is, the linear expansion coefficient of the resin X at the temperature T).

(Method of Measuring $\alpha_s(T)$)

$\alpha_s(T)$ at each temperature T is measured by a tension type measuring method using a thermomechanical analyzer. In the examples described below, "TMA4000SE" (manufactured by NETZSCH) is used as the thermomechanical analyzer.

The details of the tension type measuring method are as follows.

The tension S3 is applied to the resin base material A by adjusting the temperature of the resin base material A to 25° C., grasping both ends of the resin base material A whose temperature has been adjusted to 25° with a chuck, and applying a force in the tension direction. The tension is appropriately adjusted such that the tension S3 is maintained until the measurement of the linear expansion coefficient is completed.

In the above-described state, the linear expansion coefficient of the resin base material A at each temperature T is measured while the temperature of the resin base material A is changed. The obtained value is defined as $\alpha_s(T)$ at each temperature T.

<Tension S1, Tension S2, and Tension S3>

In the image recording method of the present disclosure, the tension S1, the tension S2, and the tension S3 are each independently a tension of 10 N/m or greater. That is, an aspect in which all the tension S1, the tension S2, and the tension S3 are the same as each other, an aspect in which only two of the tension S1, the tension S2, and the tension S3 are the same as each other and the rest is different from the two, or an aspect in which all the tension S1, the tension S2, and the tension S3 are different from each other may be employed.

The tension S1, the tension S2, and the tension S3 are each independently preferably in a range of 10 N/m to 60 N/m, more preferably in a range of 10 N/m to 50 N/m, still more preferably 10 N/m to 40 N/m, and even still more preferably in a range of 10 N/m to 30 N/m.

From the viewpoint of the efficiency of image recording, the variation of the tension S1, the tension S2, and the tension S3 represented by the following equation is preferably in a range of 0% to 40%, more preferably in a range of 0% to 20%, and still more preferably 0% to 10%.

$$\text{Variation(\%) of tension } S1, \text{tension } S2, \text{ and tension } S3 = (((\text{Maximum value of tension } S1, \text{tension } S2, \text{ and tension } S3) - (\text{minimum value of tension } S1, \text{tension } S2, \text{ and tension } S3))/((\text{maximum value of tension } S1, \text{tension } S2, \text{ and tension } S3) + (\text{minimum value of tension } S1, \text{tension } S2, \text{ and tension } S3))) \times 100$$

The tension S1, the tension S2, and the tension S3 are respectively measured by a tension meter.

The tension S1, the tension S2, and the tension S3 may be respectively adjusted using a control device (for example, a tension controller).

The method of applying the tension S1, the tension S2, and the tension S3 to the resin base material A is not particularly limited, and a known method can be appropriately used.

For example, according to the image recording method in an aspect in which the application of the pretreatment liquid and the ink in the applying step, the drying of the image in the drying step, and the cooling of the image in the cooling step are performed while the resin base material A having a long film shape is transported in a longitudinal direction using a roll-to-roll method, the operation of the applying step is easily performed while the tension S1 is applied to the resin base material A, the operation of the drying step is easily performed while the tension S2 is applied thereto, and the operation of the cooling step is easily performed while the tension S3 is applied thereto. Here, the tension to be applied to the resin base material A may be adjusted to be constant over the entire transport path.

Here, the roll-to-roll method indicates a transport method in which a long film wound in a roll shape is continuously transported while being unwound and the continuously transported long film is wound in a roll shape again.

Further, examples of the aspect of the image recording device of the present disclosure include, in addition to the above-described aspects, an aspect in which each operation of the applying step, the drying step, and the cooling step is performed on the resin base material A having a short film shape using a jig or the like while the tension is applied.

Further, in the image recording method of the present disclosure, the tension applied to the resin base material A is maintained at preferably 10 N/m or greater (more preferably in a range of 10 N/m to 60 N/m, still more preferably in a range of 10 N/m to 50 N/m, even still more preferably in a range of 10 N/m to 40 N/m, and even still more preferably in a range of 10 N/m to 30 N/m) in the entire process from the start of the applying step to the end of the cooling step.

Hereinafter, each step of the image recording method of the present disclosure will be described.

<Step of Preparing Resin Base Material A>

The image recording method of the present disclosure includes a step of preparing the resin base material A.

The step of preparing the resin base material A may be a step of simply preparing the resin base material A produced in advance in order to carry out the steps after the applying step described below or a step of producing the resin base material A.

Further, the step may be a step of performing a surface treatment on the resin base material to obtain the resin base material A.

The resin base material A and the preferred aspects are as described above.

<Step of Preparing Pretreatment Liquid>

The image recording method of the present disclosure includes a step of preparing a pretreatment liquid.

The step of preparing the pretreatment liquid may be a step of simply preparing the pretreatment liquid produced in advance in order to carry out the steps after the applying step described below or a step of producing the pretreatment liquid.

The pretreatment liquid contains water and the resin X.

(Water)

The pretreatment liquid contains water.

The content of water is preferably 50% by mass or greater and more preferably 60% by mass or greater with respect to the total amount of the pretreatment liquid.

The upper limit of the content of water depends on the amount of other components, but is preferably 90% by mass or less and more preferably 80% by mass or less with respect to the total amount of the pretreatment liquid.

(Resin X)

The pretreatment liquid contains the resin X.

The resin X is a resin that satisfies Equation (1) to Equation (3) shown above.

The resin X may be used alone or in the form of a mixture of two or more kinds of resins.

The pretreatment liquid may contain a resin other than the resin X or may not contain a resin other than the resin X.

The proportion of the resin X (the total amount of the two or more kinds of the resins X in a case where two or more kinds of the resins X are present) in all the resin components contained in the pretreatment liquid is preferably in a range of 50% by mass to 100% by mass, more preferably in a range of 60% by mass to 100% by mass, and still more preferably in a range of 80% by mass to 100% by mass.

Examples of the resin X include a polyester resin, a polyurethane resin, an acrylic resin, a polyamide resin, a polyurea resin, a polycarbonate resin, a polyolefin resin, and a polystyrene resin.

From the viewpoint of easily satisfying Equation (1) to Equation (3), at least one of an acrylic resin, a polyester resin, or a polyurethane resin is preferable, and at least one of an acrylic resin or a polyester resin is more preferable as the resin X.

In the present disclosure, the acrylic resin indicates a polymer (a homopolymer or a copolymer) of a raw material monomer containing at least one selected from the group consisting of acrylic acid, a derivative of acrylic acid (such as acrylic acid ester), methacrylic acid, and a derivative of methacrylic acid (such as methacrylic acid ester).

The weight-average molecular weight (Mw) of the resin X is preferably in a range of 1000 to 300000, more preferably in a range of 2000 to 200000, and still more preferably in a range of 5000 to 100000.

In the present disclosure, the weight-average molecular weight (Mw) indicates a value measured by gel permeation chromatography (GPC) unless otherwise specified.

The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 μl, and a measurement temperature of 40° C. using an RI detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

A form of resin particles is preferable as the form of the resin X in the pretreatment liquid.

That is, it is preferable that the pretreatment liquid contains resin particles as the resin X.

It is preferable that the resin X in this case is a water-insoluble resin.

In the present disclosure, the term "water-insoluble" indicates a property in which the amount of a substance to be dissolved in 100 g of water at 25° C. is less than 1.0 g (more preferably less than 0.5 g).

The volume average particle diameter of the resin particles serving as the resin X is preferably in a range of 1 nm to 300 nm, more preferably in a range of 3 nm to 200 nm, and still more preferably in a range of 5 nm to 150 nm.

In the present disclosure, the volume average particle diameter indicates a value measured using a laser diffraction scattering type particle size distribution analyzer.

As a measuring device, a particle size distribution measuring device "MICROTRAC MT-3300II" (manufactured by Nikkiso Co., Ltd.) is exemplified.

As the resin particles serving as the resin X, acrylic resin particles, ester resin particles, a mixture of acrylic resin particles and ester resin particles, composite particles containing an acrylic resin and an ester resin, or polyurethane resin particles are preferable, and acrylic resin particles, ester resin particles, a mixture of acrylic resin particles and ester resin particles, or composite particles containing an acrylic resin and an ester resin are more preferable.

The resin X in the resin particles (C) has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the resin particles X.

It is preferable that the resin X in the resin particles contains an ionic group in the structure.

The ionic group may be an anionic group or a cationic group, but an anionic group is preferable from the viewpoint of ease of introduction.

The anionic group is not particularly limited, but a carboxy group or a sulfo group is preferable, and a sulfo group is more preferable.

The amount of the ionic group is not particularly limited, and the ionic group can be preferably used in a case where the amount thereof is set such that the resin particles X are water-dispersible resin particles. For example, the amount thereof is preferably in a range of 0.001 mol to 1.0 mol and more preferably in a range of 0.01 mol to 0.5 mol, per 100 g of the resin contained in the resin particles X.

The content of the resin X in the pretreatment liquid is not particularly limited.

The content of the resin X is preferably in a range of 0.5% by mass to 30% by mass, more preferably in a range of 1% by mass to 20% by mass, and particularly preferably in a range of 1% by mass to 15% by mass with respect to the total amount of the pretreatment liquid.

(Aggregating Agent)

From the viewpoint of improving the image quality of the image to be formed by applying the ink, the pretreatment liquid may contain at least one aggregating agent.

Examples of the aggregating agent include an acid, a polyvalent metal compound, and a metal complex.

—Acid—

An acid may be an inorganic acid (such as nitric acid or thiocyanic acid) or an organic acid.

From the viewpoint of further improving the image quality of an image, an organic acid is preferable as the acid.

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Preferred examples of the organic compound containing a carboxy group include polyacrylic acid, acetic acid, formic acid, benzoic acid, glycolic acid, malonic acid, malic acid (preferably DL-malic acid), maleic acid, ascorbic acid, succinic acid, glutaric acid, fumaric acid, citric acid, tartaric acid, phthalic acid, adipic acid, 4-methylphthalic acid, lactic acid, sulfonic acid, orthophosphoric acid, pyrrolidone carboxylic acid, pyrrone carboxylic acid, pyrrole carboxylic acid, furan carboxylic acid, pyridine carboxylic acid, coumaric acid, thiophene carboxylic acid, and nicotinic acid. These compounds may be used alone or in combination of two or more kinds thereof.

From the viewpoint of the aggregation rate of the ink, as the organic compound containing a carboxy group, di- or higher valent carboxylic acid (hereinafter, also referred to as polyvalent carboxylic acid) is preferable, and dicarboxylic acid or tricarboxylic acid is more preferable.

As the polyvalent carboxylic acid, malonic acid, malic acid, maleic acid, succinic acid, glutaric acid, adipic acid, fumaric acid, tartaric acid, 4-methylphthalic acid, or citric acid is more preferable, and malonic acid, malic acid, tartaric acid, or citric acid is still more preferable.

It is preferable that the organic acid has a low pKa (for example, 1.0 to 5.0).

In this manner, the surface charge of particles such as polymer particles or the pigment stably dispersed in the ink by a weakly acidic functional group such as a carboxy group is reduced by bringing the particles into contact with an organic acidic compound having a lower pKa to decrease the dispersion stability.

It is preferable that the organic acid has a low pKa and a high solubility in water and is divalent or higher valent and more preferable that the organic acid is a divalent or trivalent acidic substance which has a high buffering capacity in a pH region lower than the pKa of the functional group (for example, a carboxy group) that allows the particles to be stably dispersed in the ink.

—Polyvalent Metal Compound—

Examples of the polyvalent metal compound include salts of alkaline earth metals of a group 2 (such as magnesium and calcium) in the periodic table, salts of transition metals of a group 3 (such as lanthanum) in the periodic table, salts of cations of a group 13 (such as aluminum) in the periodic table, and salts of lanthanides (such as neodymium).

Suitable examples of the salts of these metals include salts of the above-described organic acids, nitrates, chlorides, and thiocyanates.

Preferred examples of the polyvalent metal salt include a calcium salt or magnesium salt of an organic acid (such as formic acid, acetic acid, or a benzoic acid), a calcium salt or magnesium salt of nitric acid, calcium chloride, magnesium chloride, and a calcium salt or magnesium salt of thiocyanic acid.

Further, it is preferable that at least a part of the polyvalent metal compound is dissociated into polyvalent metal ions and counter ions in the pretreatment liquid.

—Metal Complex—

As the metal complex, a metal complex including at least one selected from the group consisting of zirconium, aluminum, and titanium as a metallic element is preferable.

As the metal complex, a metal complex including at least one selected from the group consisting of acetate, acetylacetonate, methylacetoacetate, ethylacetoacetate, octylene glycolate, butoxyacetylacetonate, lactate, lactate ammonium salt, and triethanol aminate as a ligand is preferable.

As the metal complex, various metal complexes are commercially available, and a commercially available metal complex may be used in the present disclosure. Further, various organic ligands, particularly various multidentate ligands that are capable of forming metal chelate catalysts are commercially available. Accordingly, a metal complex prepared by combining a commercially available organic ligand with a metal may be used.

From the viewpoint of further improving the image quality of the image, the aggregating agent contains preferably an acid and more preferably an organic acid.

The content of the aggregating agent is preferably in a range of 0.1% by mass to 40% by mass, more preferably in a range of 0.1% by mass to 30% by mass, still more preferably in a range of 1% by mass to 20% by mass, and even still more preferably in a range of 1% by mass to 10% by mass with respect to the total amount of the pretreatment liquid.

(Water-Soluble Solvent)

It is preferable that the pretreatment liquid contains at least one water-soluble solvent.

As the water-soluble solvent, known solvents can be used without particular limitation.

Examples of the water-soluble solvent include polyhydric alcohol such as glycerin, 1,2,6-hexanetriol, trimethylolpropane, alkanediol (for example, ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), or polyalkylene glycol (for example, diethylene glycol, triethylene glycol, tetraethylene glycol, pentaethylene glycol, dipropylene glycol, or polyoxyethylene polyoxypropylene glycol), polyhydric alcohol ether such as polyalkylene glycol ether (for example, diethylene glycol monoalkyl ether, triethylene glycol monoalkyl ether, tripropylene glycol monoalkyl ether, or polyoxypropylene glyceryl ether), and alkyl alcohols having 1 to 4 carbon atoms, glycol ethers, 2-pyrrolidone, and N-methyl-2-pyrrolidone described in paragraph 0116 of JP2011-42150A.

Among these, polyhydric alcohol or polyhydric alcohol ether is preferable, and alkanediol, polyalkylene glycol, or polyalkylene glycol ether is more preferable.

(Surfactant)

The pretreatment liquid may contain at least one surfactant.

The surfactant can be used as a surface tension adjuster or an antifoaming agent. Examples of the surface tension adjuster or the antifoaming agent include a nonionic surfactant, a cationic surfactant, an anionic surfactant, and a betaine surfactant. Among these, from the viewpoint of the aggregation rate of the ink, a nonionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based (fluorinated alkyl-based) surfactants and silicone-based surfactants described in JP2003-322926A, JP2004-325707A, and JP2004-309806A.

In a case where the pretreatment liquid contains a surfactant, the content of the surfactant in the pretreatment liquid is not particularly limited, but the content thereof can be set such that the surface tension of the pretreatment liquid reaches preferably 50 mN/m or less, more preferably in a range of 20 mN/m to 50 mN/m, and still more preferably in a range of 30 mN/m to 45 mN/m.

For example, in a case where the pretreatment liquid contains a surfactant as an antifoaming agent, the content of the surfactant as an antifoaming agent is preferably in a range of 0.0001% by mass to 1% by mass and more preferably in a range of 0.001% by mass to 0.1% by mass with respect to the total amount of the pretreatment liquid.

(Other Components)

The pretreatment liquid may contain other components as necessary in addition to the above-described components.

Examples of other components that may be contained in the pretreatment liquid include known additives such as a solid wetting agent, colloidal silica, an inorganic salt, a discoloration inhibitor, an emulsification stabilizer, a penetration enhancer, an ultraviolet absorbing agent, a preservative, an antibacterial agent, a pH adjuster, a viscosity adjuster, a rust inhibitor, a chelating agent, and a water-soluble polymer compound (for example, water-soluble polymer compounds described in paragraphs 0026 to 0080 of JP2013-001854A).

(Physical Properties of Pretreatment Liquid)

The pH of the pretreatment liquid at 25° C. is preferably in a range of 0.1 to 3.5.

In a case where the pH of the pretreatment liquid at 25° C. is 0.1 or greater, the roughness of the resin base material A is further decreased and the adhesiveness of the image is further improved.

In a case where the pH of the pretreatment liquid at 25° C. is 3.5 or less, the aggregation rate is further improved, coalescence of dots (ink dots) due to the ink on the resin base material A is further suppressed, and the roughness of the image is further decreased.

The pH of the pretreatment liquid at 25° C. is more preferably in a range of 0.2 to 2.0.

The pH in the present disclosure indicates a value measured using a pH meter.

From the viewpoint of the aggregation rate of the ink, the viscosity of the pretreatment liquid is preferably in a range of 0.5 mPa·s to 10 mPa·s and more preferably in a range of 1 mPa·s to 5 mPa·s.

The viscosity in the present disclosure is a value measured at 25° C. using a viscometer.

As the viscometer, for example, a VISCOMETER TV-22 type viscometer (manufactured by Toki Sangyo Co., Ltd.) can be used.

The surface tension of the pretreatment liquid is preferably 60 mN/m or less, more preferably in a range of 20 mN/m to 50 mN/m, and still more preferably in a range of 30 mN/m to 45 mN/m.

In a case where the surface tension of the pretreatment liquid is in the above-described range, the adhesiveness between the resin base material A and the pretreatment liquid is further improved.

The surface tension in the present disclosure is a value measured at a temperature of 25° C.

The surface tension can be measured using, for example, an Automatic Surface Tensiometer CBVP-Z (manufactured by Kyowa Interface Science Co., Ltd.).

<Step of Preparing Ink>

The image recording method of the present disclosure includes a step of preparing an ink.

The step of preparing an ink may be a step of simply preparing the ink produced in advance in order to carry out the steps after the applying step described below or a step of producing the ink.

The ink contains water and a colorant.

(Water)

The ink contains water.

The content of water is preferably 50% by mass or greater and more preferably 60% by mass or greater with respect to the total amount of the ink.

The upper limit of the content of water depends on the amount of other components, but is preferably 90% by mass or less and more preferably 80% by mass or less with respect to the total amount of the ink.

(Colorant)

The ink contains at least one colorant.

The colorant is not particularly limited and known colorants can be used. Among known colorants, an organic pigment or an inorganic pigment is preferable.

Examples of the organic pigment include an azo pigment, a polycyclic pigment, a chelate dye, a nitro pigment, a nitroso pigment, and aniline black. Among these, an azo pigment and a polycyclic pigment are more preferable.

Examples of the inorganic pigment include titanium oxide, iron oxide, calcium carbonate, barium sulfate, aluminum hydroxide, barium yellow, cadmium red, chrome yellow, and carbon black. Among these, carbon black is particularly preferable.

Preferred examples of the colorant include the colorants described in paragraphs 0096 to 0100 of JP2009-241586A.

The content of the colorant is preferably in a range of 1% by mass to 25% by mass, more preferably in a range of 2% by mass to 20% by mass, and particularly preferably in a range of 2% by mass to 15% by mass with respect to the total amount of the ink.

(Dispersant)

The ink may contain a dispersant used for dispersing the colorant. As the dispersant, any of a polymer dispersant or a low-molecular-weight surfactant-type dispersant may be used. Further, as the polymer dispersant, any of a water-soluble dispersant or a water-insoluble dispersant may be used.

Preferred examples of the dispersant include dispersants described in paragraphs 0080 to 0096 of JP2016-145312A.

The mixing mass ratio between a colorant (p) and a dispersant (s) (p:s) is preferably in a range of 1:0.06 to 1:3, more preferably in a range of 1:0.125 to 1:2, and still more preferably in a range of 1:0.125 to 1:1.5.

(Resin Particles)

The ink may contain resin particles.

From the viewpoint of further improving the adhesiveness and the image quality of the image, at least one of acrylic resin particles or urethane resin particles are preferable and acrylic resin particles are more preferable as the resin particles.

As the acrylic resin particles, acrylic resin particles which are self-dispersing resin particles are also preferable.

Examples of the self-dispersing resin particles include self-dispersing polymer particles described in paragraphs 0062 to 0076 of JP2016-188345A.

Further, the volume average particle diameter of the resin particles which can be contained in the ink is preferably in a range of 1 nm to 200 nm, more preferably in a range of 3 nm to 200 nm, and still more preferably in a range of 5 nm to 50 nm.

The method of measuring the volume average particle diameter of the resin particles is as described above.

The weight-average molecular weights (Mw) of the respective resins in the resin particles which can be contained in the ink are preferably in a range of 1000 to 300000, more preferably in a range of 2000 to 200000, and still more preferably in a range of 5000 to 100000.

The method of measuring the Mw is as described above.

The content of the resin particles is preferably in a range of 1% by mass to 25% by mass, more preferably in a range of 2% by mass to 20% by mass, and still more preferably in a range of 3% by mass to 15% by mass with respect to the total amount of the ink.

(Water-Soluble Organic Solvent Having Boiling Point of 210° C. or Lower)

It is preferable that the ink contains at least one water-soluble organic solvent having a boiling point of 210° C. or lower.

In this manner, the jettability of the ink can be further improved.

In the present disclosure, the term "water-soluble" indicates a property that 1 g or greater (preferably 5 g or greater and more preferably 10 g or greater) of a substance is dissolved in 100 g of water at 25° C.

In the present disclosure, the "boiling point" is a boiling point at 1 atm (101325 Pa).

Examples of the water-soluble organic solvent having a boiling point of 210° C. or lower include propylene glycol (boiling point of 188° C.), propylene glycol monomethyl ether (boiling point of 121° C.), ethylene glycol (boiling point of 197° C.), ethylene glycol monomethyl ether (boiling point of 124° C.), propylene glycol monoethyl ether (boiling point of 133° C.), ethylene glycol monoethyl ether (boiling point of 135° C.), propylene glycol monopropyl ether (boiling point of 149° C.), ethylene glycol monopropyl ether (boiling point of 151° C.), propylene glycol monobutyl ether (boiling point of 170° C.), ethylene glycol monobutyl ether (boiling point of 171° C.), 2-ethyl-1-hexanol (boiling point of 187° C.), dipropylene glycol monomethyl ether (boiling point of 188° C.), diethylene glycol dimethyl ether (boiling point of 162° C.), diethylene glycol diethyl ether (boiling point of 188° C.), and dipropylene glycol dimethyl ether (boiling point of 175° C.).

In a case where the ink contains a water-soluble organic solvent having a boiling point of 210° C. or lower, the content of the water-soluble organic solvent having a boiling point of 210° C. or lower is preferably in a range of 1% by mass to 30% by mass, more preferably in a range of 5% by mass to 30% by mass, still more preferably in a range of 10% by mass to 30% by mass, and even still more preferably in a range of 15% by mass to 25% by mass with respect to the total amount of the ink.

(Organic Solvent Having Boiling Point of Higher than 210° C.)

The content of the organic solvent having a boiling point of higher than 210° C. in the ink is preferably less than 1% by mass. In this manner, the drying properties of the ink are enhanced.

Here, the expression "the content of the organic solvent having a boiling point of higher than 210° C. in the ink is less than 1% by mass" indicates that the ink does not contain the organic solvent having a boiling point of higher than 210° C. or even in a case where the ink contains the organic solvent, the content of the organic solvent having a boiling point of higher than 210° C. is less than 1% by mass with respect to the total amount of the ink.

The expression "the content of the organic solvent having a boiling point of higher than 210° C. in the ink is less than 1% by mass" roughly indicates that the ink does not substantially contain the organic solvent having a boiling point of higher than 210° C.

Examples of the organic solvent having a boiling point of higher than 210° C. include glycerin (boiling point of 290° C.), 1,2-hexanediol (boiling point of 223° C.), 1,3-propanediol (boiling point of 213° C.), diethylene glycol (boiling point of 245° C.), diethylene glycol monobutyl ether (boiling point of 230° C.), triethylene glycol (boiling point of 285° C.), dipropylene glycol (boiling point of 232° C.), tripropylene glycol (boiling point 267° C.), trimethylolpropane (boiling point of 295° C.), 2-pyrrolidone (boiling point of 245° C.), tripropylene glycol monomethyl ether (boiling point of 243° C.), and triethylene glycol monomethyl ether (boiling point of 248° C.).

(Other Additives)

The ink may contain components other than the components described above.

Examples of other components include known additives such as a discoloration inhibitor, an emulsification stabilizer, a penetration enhancer, an ultraviolet absorbing agent, a preservative, an antibacterial agent, a pH adjuster, a surface tension adjuster, an antifoaming agent, a viscosity adjuster, a dispersion stabilizer, a rust inhibitor, and a chelating agent.

(Preferable Physical Properties of Ink)

The viscosity of the ink is preferably 1.2 mPa·s or greater and 15.0 mPa·s or less, more preferably 2 mPa·s or greater and less than 13 mPa·s, and still more preferably 2.5 mPa·s or greater and less than 10 mPa·s.

The method of measuring the viscosity is as described above.

The surface tension of the ink is preferably 25 mN/m or greater and 40 mN/m or less and more preferably 27 mN/m or greater and 37 mN/m or less.

The method of measuring the surface tension is as described above.

From the viewpoint of the dispersion stability, the pH of the ink of the present disclosure at 25° C. is preferably in a range of 6 to 11, more preferably in a range of 7 to 10, and still more preferably in a range of 7 to 9.

The method of measuring the pH is as described above.

<Applying Step>

The applying step in the image recording method of the present disclosure is a step of subsequently applying the pretreatment liquid and the ink onto the resin base material A to which tension S1 is applied, to obtain an image.

In the applying step, the pretreatment liquid is applied onto the resin base material A to which the tension S1 is applied.

The application of the pretreatment liquid onto the resin base material A can be performed using a known method such as a coating method, an ink jet method, or a dipping method.

Examples of the coating method include known coating methods using a bar coater (such as a wire bar coater), an extrusion die coater, an air doctor coater, a blade coater, a rod coater, a knife coater, a squeeze coater, a reverse roll coater, a gravure coater, or a flexo coater.

The details of the ink jet method are the same as the details of the ink jet method which can be applied to the step of applying the ink described below.

The mass (g/m$^2$) of the pretreatment liquid to be applied per unit area is preferably in a range of 0.1 g/m$^2$ to 10 g/m$^2$, more preferably in a range of 0.5 g/m$^2$ to 6.0 g/m$^2$, and still more preferably in a range of 1.0 g/m$^2$ to 4.0 g/m$^2$.

In the applying step, the resin base material A may be heated before the application of the pretreatment liquid.

The heating temperature may be appropriately set according to the kind of the resin base material A and the composition of the pretreatment liquid, but the temperature of the resin base material A is set to be preferably in a range of 20° C. to 50° C. and more preferably in a range of 25° C. to 40° C.

In the applying step, the pretreatment liquid may be heated and dried after the application of the pretreatment liquid and before the application of the ink.

Examples of the means for heating and drying the pretreatment liquid include known heating means such as a heater, known air blowing means such as a dryer, and means for combining these.

Examples of the method of heating and drying the pretreatment liquid include a method of applying heat using a heater or the like from a side of the resin base material A opposite to the surface onto which the pretreatment liquid has been applied, a method of applying warm air or hot air to the surface of the resin base material A onto which the pretreatment liquid has been applied, a method of applying heat using an infrared heater from the surface of the resin base material A onto which the pretreatment liquid has been applied or from a side of the resin base material opposite to the surface onto which the pretreatment liquid has been applied, and a method of combining a plurality of these methods.

The heating temperature of heating and drying the pretreatment liquid is preferably 35° C. or higher and more preferably 40° C. or higher.

The upper limit of the heating temperature is not particularly limited. For example, the upper limit thereof may be 100° C., and is preferably 90° C. and more preferably 70° C.

The time of heating and drying the pretreatment liquid is not particularly limited, but is preferably in a range of 0.5 seconds to 60 seconds, more preferably in a range of 0.5 seconds to 20 seconds, and particularly preferably in a range of 0.5 seconds to 10 seconds.

In the applying step, the ink is applied to at least a part of the surface of the resin base material A onto which the pretreatment liquid has been applied.

Only one or two or more kinds of inks may be applied.

For example, in a case where inks of two or more colors are applied, images with two or more colors can be recorded.

As the method of applying the ink, a known method such as a coating method, an ink jet method, or a dipping method can be used.

Among these, an ink jet method is preferable.

The method of jetting the ink in the ink jet method is not particularly limited, and any of known methods such as an electric charge control method of jetting an ink using an electrostatic attraction force, a drop-on-demand method (pressure pulse method) using a vibration pressure of a piezoelectric element, an acoustic ink jet method of jetting an ink using a radiation pressure by converting an electric signal into an acoustic beam and irradiating the ink with the acoustic beam, and a thermal ink jet (bubble jet (registered trademark)) method of heating an ink to form air bubbles and using the generated pressure may be used.

As the ink jet method, particularly, an ink jet method, described in JP1979-59936A (JP-S54-59936A), of jetting an ink from a nozzle using an action force caused by a rapid change in volume of the ink after being subjected to an action of thermal energy can be effectively used.

Further, as the ink jet method, the method described in paragraphs 0093 to 0105 of JP2003-306623A can also be employed.

The ink is applied by jetting the ink from a nozzle of an ink jet head.

Examples of the system of the ink jet head include a shuttle system of performing recording while scanning a short serial head in the width direction of the resin base material A and a line system of using a line head in which recording elements are aligned in correspondence with the entire area of one side of the resin base material A.

In the line system, image recording can be performed on the entire surface of the resin base material A by scanning the resin base material A in a direction intersecting the direction in which the recording elements are aligned. In the line system, a transport system such as a carriage that scans a short head in the shuttle system is not necessary. Further, in the line system, since movement of a carriage and complicated scanning control between the head and the resin base material A are not necessary as compared with the shuttle system, only the resin base material A moves. Therefore, according to the line system, image recording at a higher speed than that of the shuttle system can be realized.

From the viewpoint of obtaining a high-definition image, the liquid droplet amount of the ink to be jetted from the nozzle of the ink jet head is preferably in a range of 1 pico liter (pL) to 10 pL and more preferably in a range of 1.5 pL to 6 pL.

Further, from the viewpoints of improving the image unevenness and improving connection of continuous gradations, it is also effective that the ink is jetted by combining different liquid droplet amounts.

The amount of the pretreatment liquid to be applied and the amount of the ink to be applied in the applying step may be adjusted in consideration of the thickness of the image after the drying step.

The thickness of the image after the drying step (that is, the sum of the thickness of the layer derived from the pretreatment liquid and the thickness of the layer derived from the ink) is preferably in a range of 0.1 μm to 10 μm, more preferably in a range of 0.3 μm to 7 μm, still more preferably in a range of 0.7 μm to 7 μm, and even still more preferably in a range of 1 μm to 4 μm.

The thickness of the layer derived from the pretreatment liquid after the drying step is preferably in a range of 0.01 μm to 1 μm, more preferably in a range of 0.05 μm to 0.8 μm, and still more preferably 0.05 μm to 0.5 μm.

<Drying Step>

The drying step in the image recording method of the present disclosure is a step of heating the image to a temperature $T_d$ of 50° C. or higher and drying the image in a state where the tension S2 is applied to the resin base material A.

Examples of the means for heating the image include known heating means such as a heater, known air blowing means such as a dryer, and means for combining these.

Examples of the method for heating the image include a method of applying heat using a heater or the like from a side of the resin base material A opposite to an image-forming surface, a method of applying warm air or hot air to an image-forming surface of the resin base material A, a method of applying heat using an infrared heater from a side of an image-forming surface of the resin base material A and/or from a side of an image-non-forming surface of the resin base material A, and a method of combining a plurality of these methods.

From the viewpoint of image drying efficiency, the temperature $T_d$ is preferably 55° C. or higher and more preferably 60° C. or higher.

From the viewpoint of easily satisfying Equation (1) to Equation (3), the temperature $T_d$ is preferably 80° C. or lower, more preferably 70° C. or lower, still more preferably lower than 70° C., and even still more preferably 65° C. or lower.

Here, the temperature $T_d$ indicates the temperature of the surface of the image, which is a value measured using a contactless thermometer (the same applies to the temperature T and the temperature $T_r$ described later).

From the viewpoint of the adhesiveness between the image and the resin base material A, the drying time of the image is preferably 5 seconds or longer.

From the viewpoint of productivity of image recording, the drying time of the image is preferably shorter than 30 seconds, more preferably shorter than 20 seconds, still more preferably 15 seconds or shorter, and even still more preferably 10 seconds or shorter.

Here, the drying time of the image is a time period from the start of heating the image to the start of cooling of the image.

According to the image recording method of the present disclosure, since the $\sigma_{total}$ is 40 kgf/cm² or less, the adhesiveness between the image and the resin base material A can be ensured even in a case where the drying time is shortened (for example, in a case where the drying time is set to 10 seconds or shorter).

<Cooling Step>

The cooling step in the image recording method of the present disclosure is a step of cooling the image after the drying step to a temperature $T_r$ of 30° C. or lower in a state where the tension S3 is applied to the resin base material A.

Examples of the means for cooling the image include cooling means such as a cooling roll, air blowing means such as a dryer, natural cooling (air cooling), and means combining these.

Examples of the method for cooling the image include a method of bringing an image-forming surface of the resin base material A and/or an image-non-forming surface thereof into contact with a cooling roll, a method of applying cold air to an image-forming surface of the resin base material A, a method of disposing the resin base material A on which an image is formed in a space whose temperature is adjusted to the temperature $T_r$ or lower, and a method of combining a plurality of these methods.

The temperature $T_r$ is preferably in a range of 5° C. to 30° C., more preferably in a range of 10° C. to 30° C., and still more preferably in a range of 20° C. to 30° C.

The image recording method of the present disclosure may include other steps as necessary.

Examples of other steps include a step of forming an overcoat layer covering the region where the pretreatment liquid has been applied and the image recorded on a part of the region and a step of laminating a laminate base material on a side of the resin base material A, on which the image has been recorded, where the image is provided.

<One Example of Image Recording Device>

Figure 2:
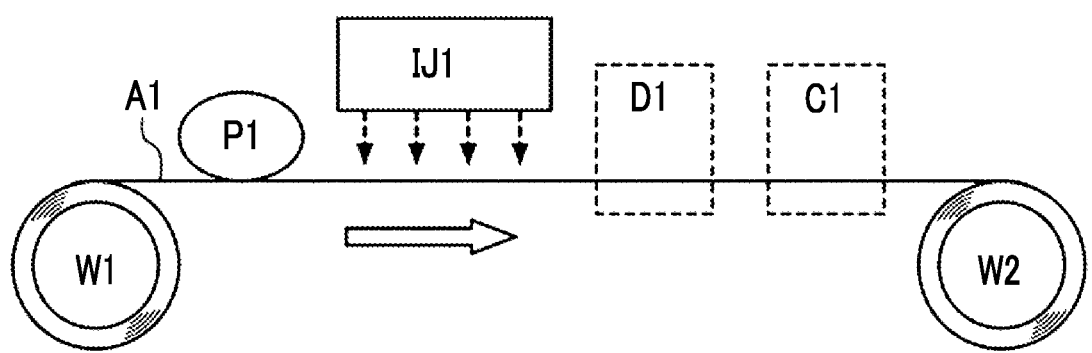
FIG. 2 is a view conceptually illustrating an example of an image recording device used for carrying out the image recording method of the present disclosure.

FIG. 2 is a view conceptually illustrating an example of an image recording device used for carrying out the image recording method of the present disclosure.

As illustrated in FIG. 2, the image recording device according to the present example is an example of an image recording device comprising a transport mechanism for transporting the resin base material A according to the roll-to-roll method, which is a device that unwinds a resin base material A1 having a long film shape, which is wound in a roll shape, using an unwinding device W1, transports the unwound resin base material A1 in the direction indicated by the block arrow, allows the resin base material A1 to pass through a pretreatment liquid applying device P1, an ink applying device IJ1, a drying zone D1, and a cooling zone C1 in this order, and finally winds the resin base material A1 using a winding device W2.

Here, the resin base material A1 is an example of the resin base material A.

The resin base material A1 is transported in a state where the tension is applied.

Specifically, the tension S1 is applied to a portion covering from the unwinding device W1 to the front of the drying zone D1, the tension S2 is applied to a portion covering from the front of the drying zone D1 to the front of the cooling zone C1, and the tension S3 is applied to a portion covering from the front of the cooling zone C1 to the winding device W2, in the transported resin base material A1.

The tension to be applied to the resin base material A1 may be constant over the entire transport path (that is, the relationship of "tension S1=tension S2=tension S3" may be established), the variation of the tension S1, the tension S2, and the tension S3 may be reduced to, for example, 40% or less, or the variation may not be particularly controlled.

The image recording device according to the present example may comprise a tension adjusting unit that adjusts the tension S1, the tension S2, and the tension S3.

Examples of the tension adjusting unit include a powder brake provided in the unwinding device W1 and/or the winding device W2, a dancer roll provided in the middle of a transport path, and a control device (for example, a tension controller) that controls each tension by adjusting each condition of the image recording device.

Further, the image recording device according to the present example may comprise a tension measuring unit (for example, a tension meter) for measuring the tension S1, the tension S2, and the tension S3.

Since FIG. 2 is a conceptual view, the transport path of the resin base material A1 is simplified and shown such that the resin base material A1 is transported in one direction, but it goes without saying that the transport path of the resin base material A1 may meander.

The method of transporting the resin base material A1 can be appropriately selected from various web transport methods of using a drum, a roller, and the like.

The pretreatment liquid applying device P1 and the ink applying device IJ1 are sequentially disposed on the downstream side of the resin base material A1 in the transport direction (hereinafter, also simply referred to as "the downstream side") with respect to the unwinding device W1 that unwinds the resin base material A1.

In the pretreatment liquid applying device P1 and the ink applying device IJ1, the applying step (that is, the applying step of sequentially applying the pretreatment liquid and the ink onto the resin base material A to which the tension S1 to obtain an image) is performed.

The method of applying the pretreatment liquid and the method of applying the ink are as described in the section of the "applying step".

A zone (not illustrated) where the pretreatment liquid is dried may be provided between the pretreatment liquid applying device P1 and the ink applying device IJ1.

A surface treatment unit (not illustrated) that performs a surface treatment (preferably, a corona treatment) on the resin base material A1 may be provided on the upstream side of the resin base material A1 in the transport direction with respect to the pretreatment liquid applying device P1.

Although not illustrated, the structure of the ink applying device IJ1 may be a structure comprising at least one ink jet head.

The ink jet head may be a shuttle head, but a line head in which a large number of jetting ports (nozzles) are aligned in the width direction of the resin base material A having a long film shape is preferable from the viewpoint of speeding up image recording.

From the viewpoint of speeding up of image recording, it is preferable that the structure of the ink applying device IJ1 is a structure comprising at least one of a line head for black (K) ink, a line head for cyan (C) ink, a line head for magenta (M) ink, or a line head for yellow (Y) ink.

As the structure of the ink applying device IJ1, a structure which comprises at least two of the above-described four line heads and in which two or more of these line heads are aligned in the transport direction of the resin base material A (the direction indicated by the block arrow) is more preferable.

The ink applying device IJ1 may further comprise at least one of a line head for white ink, a line head for orange ink, a line head for green ink, a line head for purple ink, a line head for light cyan ink, or a line head for light magenta ink.

The drying zone D1 is disposed on the downstream side of the ink applying device IJ1.

In the drying zone D1, the drying step (that is, the drying step of heating the image to a temperature $T_d$ of 50° C. or higher and drying the image in a state where a tension S2 of 10 N/m or greater is applied to the resin base material A) is performed.

The method of drying the image is as described in the section of the "drying step".

The cooling zone C1 is disposed on the downstream side of the drying zone D1.

In the cooling zone C1, the cooling step (that is, the cooling step of cooling the image after the drying step to a temperature $T_r$ of 30° C. or lower in a state where the tension S3 is applied to the resin base material A) is performed.

The method of cooling the image is as described in the section of the "cooling step".

In the image recording using the image recording device according to the present example, first, the resin base material A1 having a long film shape which is wound in a roll shape is unwound by the unwinding device W1, the unwound resin base material A1 is transported in the direction indicated by the block arrow, an image is formed on the transported resin base material A1 by performing the above-described applying step using the pretreatment liquid applying device P1 and the ink applying device IJ1.

Next, the above-described drying step is performed to dry the image in the drying zone D1, the above-described cooling step is performed to cool the image in the cooling zone C1, and the resin base material A1 on which the image is recorded is wound up by the winding device W2.

In the image recording, a decrease in adhesiveness of the image to the resin base material A1 is suppressed by controlling the above-described $\sigma_{total}$ to 40 kgf/cm² or less.

EXAMPLES

Hereinafter, examples of the present disclosure will be described below, but the present disclosure is not limited to the following examples.

Hereinafter, "parts" and "%" are on a mass basis unless otherwise specified.

Further, in the description below, "water" indicates ion exchange water unless otherwise specified.

[Preparation of Aqueous Dispersion Liquid of Resin X]

As aqueous dispersion liquids of the resin X, an aqueous dispersion liquid of resin particles E1 (specifically, composite particles containing a polyester resin and an acrylic resin) as the resin X, an aqueous dispersion liquid of acrylic resin particles AC1 as resin X, and an aqueous dispersion liquid of acrylic resin particles AC2 as resin X were respectively prepared.

<Aqueous Dispersion Liquid of Resin Particles E1>

PESRESIN A-615GE (manufactured by Takamatsu Oil & Fat Co., Ltd.) was prepared as an aqueous dispersion liquid of resin particles E1 (specifically, composite particles containing a polyester resin and an acrylic resin).

<Aqueous Dispersion Liquid of Acrylic Resin Particles AC1>

An aqueous dispersion liquid of the acrylic resin particles AC1 was prepared. Hereinafter, the details will be described.

3.0 g of sodium dodecyl benzene sulfonate (62 mass % aqueous solution, manufactured by Tokyo Chemical Industry Co., Ltd.) and 377 g of water were added to a 1000 mL three-neck flask provided with a stirrer and a cooling pipe, and the solution was heated to 90° C. in a nitrogen atmosphere. A solution A obtained by adding 9.0 g of a 50 mass % aqueous solution of sodium 2-acrylamido-2-methylpropane sulfonate (manufactured by Sigma-Aldrich Co., LLC) to 20 g of water, a solution B obtained by mixing 12.5 g of 2-hydroxyethyl methacrylate (manufactured by Fujifilm Wako Pure Chemical Corporation), 27.0 g of benzyl acrylate (manufactured by Tokyo Chemical Industry Co., Ltd.), and 6.0 g of styrene (manufactured by Fujifilm Wako Pure Chemical Corporation), and a solution C obtained by dissolving 6.0 g of sodium persulfate (manufactured by Fujifilm Wako Pure Chemical Corporation) in 40 g of water were simultaneously added dropwise to the heated mixed solution in the three-neck flask for 3 hours. After completion of the dropwise addition, the solution was allowed to further react for 3 hours, thereby synthesizing 500 g of an aqueous dispersion liquid of the acrylic resin particles AC1 (the amount of the solid content of the acrylic resin particles AC1: 10.1% by mass).

Further, the weight-average molecular weight of the acrylic resin of the acrylic resin particles AC1 was 149000.

<Aqueous Dispersion Liquid of Acrylic Resin Particles AC2>

An aqueous dispersion liquid of the acrylic resin particles AC2 was prepared. Hereinafter, the details will be described.

3.0 g of sodium dodecyl benzene sulfonate (62 mass % aqueous solution, manufactured by Tokyo Chemical Industry Co., Ltd.) and 376 g of water were added to a 1000 mL three-neck flask provided with a stirrer and a cooling pipe, and the solution was heated to 90° C. in a nitrogen atmosphere. A solution A obtained by adding 11.0 g of a 50 mass % aqueous solution of sodium 2-acrylamido-2-methylpropane sulfonate (manufactured by Sigma-Aldrich Co., LLC) to 20 g of water, a solution B obtained by mixing 12.5 g of 2-hydroxyethyl methacrylate (manufactured by Fujifilm Wako Pure Chemical Corporation), 17.0 g of butyl methacrylate (manufactured by Fujifilm Wako Pure Chemical Corporation), and 15.0 g of styrene (manufactured by Fujifilm Wako Pure Chemical Corporation), and a solution C obtained by dissolving 6.0 g of sodium persulfate (manufactured by Fujifilm Wako Pure Chemical Corporation) in 40 g of water were simultaneously added dropwise to the heated mixed solution in the three-neck flask for 3 hours. After completion of the dropwise addition, the resulting solution was allowed to further react for 3 hours, thereby synthesizing 500 g of an aqueous dispersion liquid of the acrylic resin particles AC2 (the amount of the solid content of the specific resin 1: 10.1% by mass).

Further, the weight-average molecular weight of the acrylic resin AC2 was 126000.

<Aqueous Dispersion Liquid of Urethane Resin Particles U1>

SUPERFLEX 620 (manufactured by DKS Co., Ltd.) was prepared as an aqueous dispersion liquid of urethane resin particles U1.

Example 1

<Preparation of Pretreatment Liquid>

A pretreatment liquid having the following composition was prepared.

—Composition of Pretreatment Liquid—

Aggregating agent (glutaric acid, manufactured by FUJIFILM Wako Pure Chemical Corporation; organic acid) . . . 4% by mass Resin particles E1 as resin X . . . 8% by mass as solid content of resin particles E1

1,2-Propanediol (manufactured by FUJIFILM Wako Pure Chemical Corporation) (water-soluble solvent) . . . 3% by mass Antifoaming agent (TSA-739 (15% by mass), manufactured by Momentive Performance Materials Japan LLC, emulsion type silicone antifoaming agent) . . . 0.01% by mass as solid content of antifoaming agent OLFINE E1010 (manufactured by Nissin Chemical Co., Ltd.) (surfactant) . . . 0.1% by mass Water . . . remaining amount set such that total amount of composition was 100% by mass <Preparation of Cyan Ink>

A cyan ink with the following composition was prepared.

—Composition of Cyan Ink—
- CAB-O-JET450C (manufactured by Cabot Corporation, cyan pigment dispersion liquid, concentration of pigment: 15% by mass) . . . 2.4% by mass as amount of solid content
- 1,2-Propanediol (manufactured by Fujifilm Wako Pure Chemical Corporation) (water-soluble solvent) . . . 20% by mass
- OLFINE E1010 (manufactured by Nissin Chemical Co., Ltd.) (surfactant) . . . 1% by mass
- Acrylic resin particles IA-1 shown below (resin particles) . . . 8% by mass as amount of resin particles
- SNOWTEX (registered trademark) XS (manufactured by Nissan Chemical Co., Ltd., colloidal silica) . . . 0.06% by mass as amount of solid content of silica
- Water . . . remaining amount set such that total amount of composition was 100% by mass (Preparation of Aqueous Dispersion Liquid of Acrylic Resin Particles IA-1)

The acrylic resin particles IA-1 in the composition of the cyan ink were produced in the following manner.

A 2 L three-neck flask provided with a stirrer, a thermometer, a reflux cooling pipe, and a nitrogen gas introduction pipe was charged with 560.0 g of methyl ethyl ketone, and the solution was heated to 87° C. Next, a mixed solution consisting of 220.4 g of methyl methacrylate, 301.6 g of isobornyl methacrylate, 58.0 g of methacrylic acid, 108 g of methyl ethyl ketone, and 2.32 g of "V-601" (polymerization initiator, manufactured by Fujifilm Wako Pure Chemical Corporation, dimethyl 2,2'-azobis(2-methyl propionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1) . . . A solution formed of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as "the reaction").

After completion of the reaction, the temperature of the solution was decreased to 65° C., 163.0 g of isopropanol was added to the solution, and the solution was allowed to be naturally cooled, thereby obtaining a polymerization solution (concentration of solid contents: 41.0%) containing a copolymer of methyl methacrylate, isobornyl methacrylate, and methacrylic acid (=38/52/10 [mass ratio]).

The weight-average molecular weight (Mw) of the copolymer was 63000, and the acid value thereof was 65.1 (mgKOH/g).

Next, 317.3 g (concentration of solid contents: 41.0% by mass) of the obtained polymerization solution was weighed, 46.4 g of isopropanol, 1.65 g of a 20% maleic acid anhydride aqueous solution (water-soluble acidic compound, corresponding to 0.3% by mass as maleic acid with respect to the copolymer), and 40.77 g of a 2 mol/L NaOH aqueous solution were added to the solution, and the temperature of the liquid in the reaction container was increased to 70° C.

Next, 380 g of distilled water was added dropwise to the solution, which had been heated to 70° C., at a speed of 10 ml/min, and water dispersion was performed (dispersion step).

Thereafter, a total amount of 287.0 g of isopropanol, methyl ethyl ketone, and distilled water was distilled off by maintaining the temperature of the liquid in the reaction container at 70° C. for 1.5 hours under reduced pressure (solvent removal step). 0.278 g (440 ppm as benzisothiazolin-3-one with respect to the solid content of the polymer) of PROXEL GXL (S) (manufactured by Arch Chemicals, Inc.) was added to the obtained liquid.

The obtained liquid was filtered using a filter having a mesh diameter of 1 μm, and the filtrate was collected, thereby obtaining an aqueous dispersion liquid of the acrylic resin particles IA-1 whose concentration of solid contents was 26.5% by mass.

The glass transition temperature (Tg) of the acrylic resin particles IA-1 was 120° C., and the volume average particle diameter thereof was 10 nm.

In Example 1, the cyan ink was allowed to contain 8% by mass of acrylic resin particles IA-1 in terms of the amount of the resin particles using the aqueous dispersion liquid of the acrylic resin particles IA-1.

<Preparation of Resin Base Material A>

As the resin base material A, a biaxially stretched polypropylene (OPP) base material "FOR-AQ" (manufactured by Futamura Chemical Co., Ltd.) was prepared.

"FOR-AQ" is a roll body in which an OPP base material having a thickness of 25 μm, a width of 580 mm, and a length of 2000 m is wound in a roll shape.

Hereinafter, the OPP base material will be referred to as a "resin base material 01", and the roll body will be referred to as a "roll body 1".

The distortion rate (a1) of the resin base material 01 was 0.18%.

(Preparation of Image Recording Device)

As the image recording device used for the evaluation, the image recording device illustrated in FIG. 2 according to the above-described example was prepared.

A gravure coater was used as the pretreatment liquid applying device P1.

A zone for drying the pretreatment liquid (warm air drying was used as the drying method) was provided between the pretreatment liquid applying device P1 and the ink applying device U1.

A tension controller ("LE-40MTA" manufactured by Mitsubishi Electric Corporation) was incorporated in the image recording device, and the tension S1, the tension S2, and the tension S3 were controlled using the tension controller in image recording described below.

Further, a tension meter ("CJ200" manufactured by Nireco Corporation) that measures the tension S1, the tension S2, and the tension S3 was incorporated in the image recording device, and the tension S1, the tension S2, and the tension S3 were measured using the tension meter in the image recording described below.

The ink jet head and the ink jetting conditions for the ink applying device IJ1 were as follows.

Ink jet head: 1200 dpi (dot per inch, 1 inch is 2.54 cm)/20-inch width piezo full line head (total number of nozzles: 2048) was used.

Ink droplet amount: set to 2.0 pL

Driving frequency: set to 30 kHz

Warm air drying was used as the drying method in the drying zone D1.

Air cooling was used as the cooling method in the cooling zone C1.

(Image Recording)

The roll body 1 was set in the unwinding device W1 of the image recording device, and the above-described pretreatment liquid was set in the pretreatment liquid applying device P1 of this image recording device.

Next, the resin base material A (OPP base material) was unwound from the roll body 1 by the unwinding device W1, and the unwound resin base material A was transported at a transport speed of 635 mm/sec.

Adjustment was made such that a tension of 10 N/m was applied to the resin base material A over the entire transport path of the transported resin base material A. That is, all the tension S1 applied to a portion covering from the unwinding device W1 to the front of the drying zone D1, the tension S2 applied to a portion covering from the front of the drying zone D1 to the front of the cooling zone C1, and the tension S3 applied to a portion covering from the front of the cooling zone C1 to the winding device W2 were adjusted to 10 N/m.

The entire one surface of the resin base material A during the transport was coated with the pretreatment liquid such that the coating amount thereof reached 1.5 g/m² (liquid coating amount, 0.1 g/m² to 0.2 g/m² in terms of dry coating amount) using a gravure coater as the pretreatment liquid applying device P1, and the applied pretreatment liquid was dried with warm air for 8 seconds in the pretreatment liquid drying zone (not illustrated) under a film surface temperature condition of 60° C.

The above-described cyan ink was applied to a part of the region of the resin base material A where the pretreatment liquid had been applied and dried, in the form of a solid image using the ink applying device IJ1 according to the ink jet method, thereby obtaining an undried cyan solid image.

Here, the region where the cyan ink was applied was set as a band-shaped region having a width of 250 mm with a central portion in the width direction as a center in a total width of 580 mm of the resin base material A1. Here, the mass of the cyan ink to be applied per unit area in the region where the cyan ink was applied was set to 3.5 g/m².

Next, the solid image in the resin base material A transported from the ink applying device IJ1 was heated under a condition that the reached temperature (temperature T0 was set to 60° C. and the drying time (that is, the time from the start of heating to the start of cooling) was set to 8 seconds in the drying zone D1 and dried.

Next, the solid image (that is, the solid image after being dried) in the resin base material A transported from the drying zone D1 was cooled to 25° C. (temperature $T_r$).

The solid image was cooled, and the resin base material A (that is, the image recorded material in which the solid image was recorded on the resin base material A) was wound by the winding device W2.

Hereinafter, the wound image recorded material will be referred to as a "roll body 2".

The roll body 2 was allowed to stand at 25° C. for 1 hour.

As described above, a cyan solid image was recorded on the entire band-shaped region having a width of 250 mm on the resin base material A.

The thickness of the cyan solid image (that is, the total thickness of the layer derived from the pretreatment liquid and the layer derived from the cyan ink) was 2 μm, and the thickness of the layer derived from the pretreatment liquid was 0.15 μm. The thickness of the cyan solid image and the thickness of the layer derived from the pretreatment liquid were measured by observing a cross section of the cyan solid image with a scanning electron microscope (SEM) at a magnification of 10000 times.

<Measurement of $E(T_d)$>

$E(T_d)$ was measured by the above-described method using the aqueous dispersion liquid of the resin X.

The results are listed in Table 1.

<Measurement of $\varepsilon(T_d)$>

$\varepsilon(T_d)$ was measured by the above-described method using the resin base material A.

The results are listed in Table 1.

<Calculation of $\sigma_{dry}$>

$\sigma_{dry}$ was calculated by Equation (2) based on $E(T_d)$ and $\varepsilon(T_d)$.

The results are listed in Table 1.

<Measurement of $E(T)$, $\alpha_r(T)$, and $\alpha_s(T)$>

$E(T)$, $\alpha_r(T)$, and $\alpha_s(T)$ were measured for each temperature T obtained by dividing a range of the temperature $T_r$ or higher and the temperature $T_d$ or lower at intervals of 0.1° C. using the aqueous dispersion liquid of the resin X and the resin base material A according to the above-described methods.

The notation of the result is not provided.

<Calculation of $\sigma_{cool}$>

"$E(T)(\alpha_r(T)-\alpha_s(T))$" at each temperature T was acquired based on the results of $E(T)$, $\alpha_r(T)$, and $\alpha_s(T)$ at each temperature T.

$\sigma_{cool}$ was acquired by Equation (3) based on the obtained result of "$E(T)(\alpha_r(T)-\alpha_s(T))$".

Specifically, a graph showing the relationship between the temperature T and "$E(T)(\alpha_r(T)-\alpha_s(T))$" was prepared, an area enclosed by the curve of the obtained graph, the straight line showing the temperature $T_r$, the straight line showing the temperature $T_d$, and the straight line in which "$E(T)(\alpha_r(T)-\alpha_s(T))$" was 0 was acquired, and obtained area was set to $\sigma_{cool}$.

The results are listed in Table 1.

The graph in Example 1 is shown in FIG. 1.

<Calculation of $\sigma_{total}$>

$\sigma_{total}$ was calculated by Equation (1) based on the results of $\sigma_{dry}$ and $\sigma_{cool}$.

The results are listed in Table 1.

<Evaluation of Adhesiveness of Image>

Next, the adhesiveness of the image was evaluated by unwinding the image recorded material from the roll body 2 that had been allowed to stand at 25° C. for 1 hour, attaching a piece of tape of Cellotape (registered trademark, No. 405, manufactured by Nichiban Co., Ltd., width of 12 mm, hereinafter, also simply referred to as "tape") onto the cyan solid image on the unwound image recorded material, and peeling the piece of tape off from the cyan solid image.

Specifically, the tape was attached and peeled off according to the following method.

The tape was taken out at a constant speed and cut to have a length of 75 mm, thereby obtaining a piece of tape.

The obtained piece of tape was superimposed on the cyan solid image, and a region at the central portion of the piece of tape with a width of 12 mm and a length of 25 mm was attached onto the image using a finger and rubbed firmly with a fingertip.

The end of the piece of tape was grabbed in 5 minutes after attachment of the piece of tape and peeled at an angle as close to 60° as possible in 0.5 seconds to 1.0 seconds.

The presence or absence of adhesive matter on the piece of peeled tape and the presence or absence of peeling of the cyan solid image on the resin base material A were visually observed, and the adhesiveness of the image was evaluated based on the following evaluation standards.

The results are listed in Table 1.

—Evaluation Standards for Adhesiveness of Image—

5: Adhesive matter was not found on the piece of tape, and peeling of the image on the resin base material A was not found.

4: A small amount of colored adhesive matter was found on the piece of tape, but peeling of the image on the resin base material A was not found.

3: A small amount of colored adhesive matter was found on the piece of tape, and slight peeling of the image on the resin base material A was found, but it was in a practically acceptable range.

2: Colored adhesive matter was found on the piece of tape, peeling of the image on the resin base material A was found, and it was out of a practically acceptable range.

1: Colored adhesive matter was found on the piece of tape, most of the image on the resin base material A was peeled off, and the resin base material A was visually recognized.

Examples 2 to 15 and Comparative Examples 1 to 4

The same operation as in Example 1 was performed except that the combinations of the kind of the resin base material A, the kind of the resin X, the tension S1, the tension S2, the tension S3, the temperature $T_d$, and the temperature $T_r$ were changed as listed in Table 1.

The results are listed in Table 1.

A resin base material N1 as the resin base material A is a simultaneously biaxially stretched nylon base material "EMBLEM (registered trademark) ON-15" (manufactured by Unitika Ltd., a roll body in which a nylon base material having a thickness of 15 μm, a width of 580 mm, and a length of 2000 m is wound in a roll shape). The distortion rate (a1) of the resin base material N1 was −0.26%.

A resin base material HDPE as the resin base material A is a monoaxially stretched high-density polyethylene base material "PE3K-BT" (manufactured by Futamura Chemical Co., Ltd., a roll body in which a base material having a thickness of 23 μm, a width of 580 mm, and a length of 2000 m is wound in a roll shape). The distortion rate (a1) of the resin base material HDPE was 0.23%.

TABLE 1

| | Resin base materialA | | Resin X in | Applying step | Drying step | | Cooling step | | $E(T_d)$ | | $\sigma_{dry}$ | $\sigma_{cool}$ | $\sigma_{total}$ | Ad- |
|---|---|---|---|---|---|---|---|---|---|---|---|---|---|---|
| | Type | Distortion rate (%) | pre-treatment liquid | S1 (N/m) | S2 (N/m) | $T_d$ (°C.) | S3 (N/m) | $T_r$ (°C.) | (kgf/cm²) | $\epsilon(T_d)$ | (kgf/cm²) | (kgf/cm²) | (kgf/cm²) | hesive-ness |
| Example 1 | O1 | 0.18 | E1 | 10 | 10 | 60 | 10 | 25 | 7100 | $5.0 \times 10^{-5}$ | 0.36 | −27 | 27 | 5 |
| Example 2 | O1 | 0.18 | AC1 | 10 | 10 | 60 | 10 | 25 | 20 | $5.0 \times 10^{-5}$ | 0.0010 | 0.10 | 0 | 5 |
| Example 3 | O1 | 0.18 | AC2 | 10 | 10 | 60 | 10 | 25 | 8200 | $5.0 \times 10^{-5}$ | 0.41 | −14 | 14 | 5 |
| Example 4 | O1 | 0.18 | AC1 | 30 | 30 | 60 | 30 | 25 | 20 | $1.8 \times 10^{-3}$ | 0.036 | −0.10 | 0 | 5 |
| Comparative Example 1 | O1 | 0.18 | E1 | 10 | 10 | 70 | 10 | 25 | 3700 | $-1.3 \times 10^{-3}$ | −4.8 | −38 | 43 | 1 |
| Comparative Example 2 | O1 | 0.18 | E1 | 10 | 10 | 80 | 10 | 25 | 2500 | $-3.8 \times 10^{-3}$ | −9.5 | −44 | 54 | 1 |
| Comparative Example 3 | N1 | −0.26 | E1 | 10 | 10 | 60 | 10 | 25 | 7100 | $-5.3 \times 10^{-3}$ | −38 | −15 | 53 | 1 |
| Example 5 | N1 | −0.26 | AC1 | 10 | 10 | 60 | 10 | 25 | 20 | $-5.3 \times 10^{-3}$ | −0.11 | 2.1 | 2 | 5 |
| Example 6 | N1 | −0.26 | AC2 | 10 | 10 | 60 | 10 | 25 | 8200 | $-5.3 \times 10^{-3}$ | −43 | 7.9 | 35 | 3 |
| Example 7 | N1 | −0.26 | E1 | 30 | 30 | 60 | 30 | 25 | 7100 | $-2.6 \times 10^{-3}$ | −19 | −12 | 31 | 3 |
| Example 8 | N1 | −0.26 | AC1 | 30 | 30 | 60 | 30 | 25 | 20 | $-2.6 \times 10^{-3}$ | −0.052 | 2.1 | 2 | 5 |
| Example 9 | HDPE | 0.23 | E1 | 10 | 10 | 60 | 10 | 25 | 7100 | $1.0 \times 10^{-3}$ | 7.1 | −42 | 35 | 3 |
| Example 10 | HDPE | 0.23 | AC1 | 10 | 10 | 60 | 10 | 25 | 20 | $1.0 \times 10^{-3}$ | 0.020 | −2.3 | 2 | 5 |
| Example 11 | HDPE | 0.23 | AC2 | 10 | 10 | 60 | 10 | 25 | 8200 | $1.0 \times 10^{-3}$ | 8.2 | −30 | 22 | 5 |
| Example 12 | HDPE | 0.23 | AC1 | 10 | 10 | 80 | 10 | 25 | 5.1 | $2.2 \times 10^{-3}$ | 0.011 | −2.9 | 3 | 5 |
| Example 13 | HDPE | 0.23 | AC1 | 30 | 30 | 60 | 30 | 25 | 20 | $2.3 \times 10^{-3}$ | 0.046 | −2.2 | 2 | 5 |
| Example 14 | O1 | 0.18 | U1 | 10 | 10 | 60 | 10 | 25 | 5700 | $5.0 \times 10^{-5}$ | 0.29 | −12 | 11 | 5 |
| Example 15 | N1 | −0.26 | AC1 | 10 | 10 | 50 | 10 | 25 | 50 | $-4.5 \times 10^{-3}$ | −0.23 | 1.7 | 2 | 5 |
| Comparative Example 4 | N1 | −0.26 | AC2 | 10 | 10 | 50 | 10 | 25 | 13000 | $-4.5 \times 10^{-3}$ | −59 | 5.5 | 54 | 1 |

As listed in Table 1, in Examples 1 to 15 in which $\sigma_{total}$ was 40 kgf/cm² or less, the adhesiveness of the image to the resin base material A was excellent as compared with Comparative Examples 1 to 4 in which $\sigma_{total}$ was greater than 40 kgf/cm².

It was confirmed that in a case where $\sigma_{total}$ was 30 kgf/cm² or less, the adhesiveness of the image to the resin base material A was further improved.

As described above, the example group using the cyan ink as the ink has been described. However, it goes without saying that the same effects as those of the above-described example group can be obtained even in a case where the cyan ink was changed to an ink other than the cyan ink (for example, magenta ink, yellow ink, or black ink) in the example group or in a case where a polychromic image was recorded using the cyan ink and at least one ink other than the cyan ink.

The disclosure of JP2019-137000 filed on Jul. 25, 2019 is incorporated herein by reference in its entirety.

In a case where all documents, patent applications, and technical standards described in the present specification are specified to be incorporated specifically and individually as cited documents, the documents, patent applications, and technical standards are incorporated herein in the same limited scope as the cited documents.

What is claimed is:

1. An image recording method comprising:
preparing a resin base material A in which an absolute value of a distortion rate represented by Equation (a1) in a case where the base material is heated from 25° C. to 60° C. at a temperature increasing rate of 5° C./min and maintained at 60° C. for 2 minutes in a state where a tension of 30 N/m is applied thereto, and the base material is cooled to 25° C. at a temperature decreasing rate of 5° C./min in a state where a tension of 30 N/m is applied thereto is 0.05% or greater;
preparing a pretreatment liquid containing water and a resin X;
preparing an ink containing water and a colorant;
sequentially applying the pretreatment liquid and the ink onto the resin base material A to which a tension S1 of 10 N/m or greater is applied to obtain an image;
heating and drying the image to a temperature $T_d$ of 50° C. or higher in a state where a tension S2 of 10 N/m or greater is applied to the resin base material A; and
cooling the image after the drying to a temperature $T_r$ of 30° C. or lower in a state where a tension S3 of 10 N/m or greater is applied to the resin base material A,
wherein $\sigma_{total}$ to be calculated by Equation (1) is 40 kgf/cm² or less, distortion rate(%)=((length of resin base material in tension application direction at end of cooling−length thereof in tension application direction at start of heating)/length thereof in tension application direction at start of heating)×100      Equation (a1)

$$\sigma_{total} = |\sigma_{dry} + \sigma_{cool}|  \qquad \text{Equation (1)}$$

$$\sigma_{dry} = E(T_d)\,\varepsilon(T_d)  \qquad \text{Equation (2)}$$

$$\sigma_{cool} = \int_{T_r}^{T_d} E(T)(\alpha_r(T) - \alpha_s(T))dT  \qquad \text{Equation (3)}$$

in Equation (1), $\sigma_{dry}$ is calculated by Equation (2), and $\sigma_{cool}$ is calculated by Equation (3),
in Equation (2),
$E(T_d)$ represents an elastic modulus of the resin X at the temperature $T_d$ which is expressed in a unit of kgf/cm²,
$\varepsilon(T_d)$ represents an expansion coefficient of the length of the resin base material A represented by Equation (a2) in the tension application direction in a case where the base material is heated from 25° C. to the temperature $T_d$ and maintained at the temperature $T_d$ in a state where the tension S2 is applied thereto, and the base material is cooled to 25° C. in a state where the tension S2 is applied thereto, expansion coefficient of length of resin base material A in tension application direction=(length of resin base material in tension application direction at end of cooling−length thereof in tension application direction at start of heating)/length thereof in tension application direction at start of heating      Equation (a2)

in Equation (3),
$E(T)$ represents an elastic modulus of the resin X at a temperature T of the image in the cooling which is expressed in the unit of kgf/cm²,
$\alpha_r(T)$ represents a linear expansion coefficient of the resin X at the temperature T,
$\alpha_s(T)$ represents a linear expansion coefficient of the resin base material A in the tension application direction in a state where the tension S3 is applied thereto at the temperature T,
$T_d$ represents the temperature $T_d$, and
$T_r$ represents the temperature $T_r$.

2. The image recording method according to claim 1, wherein $\sigma_{total}$ is 30 kgf/cm² or less.

3. The image recording method according to claim 1, wherein the tension S1, the tension S2, and the tension S3 are each independently in a range of 10 N/m to 60 N/m.

4. The image recording method according to claim 1, wherein the resin base material A has a thickness of 12 μm to 60 μm.

5. The image recording method according to claim 1, wherein the resin base material A is a polypropylene base material or a nylon base material.

6. The image recording method according to claim 1, wherein the resin X is at least one of an acrylic resin or a polyester resin.

7. The image recording method according to claim 1, wherein the resin base material A has a long film shape, and
the application of the pretreatment liquid and the ink in the applying, the drying of the image in the drying, and the cooling of the image in the cooling are performed while the resin base material A is transported in a longitudinal direction of the resin base material A using a roll-to-roll method.

* * * * *